United States Patent
Rapaka et al.

(10) Patent No.: US 11,936,867 B2
(45) Date of Patent: Mar. 19, 2024

(54) ADAPTIVE QUANTIZER DESIGN FOR VIDEO CODING

(71) Applicant: Apple Inc., Cupertino, CA (US)

(72) Inventors: Krishnakanth Rapaka, San Jose, CA (US); Jaehong Chon, Cupertino, CA (US); Alexandros Tourapis, Milpitas, CA (US); David W. Singer, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 242 days.

(21) Appl. No.: 17/234,596

(22) Filed: Apr. 19, 2021

(65) Prior Publication Data

US 2021/0400273 A1    Dec. 23, 2021

Related U.S. Application Data

(60) Provisional application No. 63/147,163, filed on Feb. 8, 2021, provisional application No. 63/042,451, filed on Jun. 22, 2020.

(51) Int. Cl.
| | |
|---|---|
| *H04N 19/124* | (2014.01) |
| *H04N 19/172* | (2014.01) |
| *H04N 19/186* | (2014.01) |
| *H04N 19/82* | (2014.01) |

(52) U.S. Cl.
CPC ......... *H04N 19/124* (2014.11); *H04N 19/172* (2014.11); *H04N 19/186* (2014.11); *H04N 19/82* (2014.11)

(58) Field of Classification Search
CPC .. H04N 19/124; H04N 19/172; H04N 19/186; H04N 19/82
See application file for complete search history.

(56) References Cited

U.S. PATENT DOCUMENTS

| | | | |
|---|---|---|---|
| 6,990,243 B1* | 1/2006 | Kuniba ............... | H04N 19/124 375/E7.176 |
| 2012/0051421 A1* | 3/2012 | Lu ........................ | H04N 19/124 375/240.03 |
| 2013/0051457 A1* | 2/2013 | Joshi .................... | H04N 19/61 375/240.03 |
| 2014/0003497 A1 | 1/2014 | Sullivan et al. | |
| 2016/0050443 A1* | 2/2016 | Van der Auwera .. | H04N 19/117 375/240.03 |

(Continued)

OTHER PUBLICATIONS

F. Pu et al., "Comments on reshaping for HDR/WCG compression," ISO/IEC JTC1 /SC29/WG 11 MPEG2015/M37267, Oct. 2015, Geneva, Switzerland. (Year: 2015).*

(Continued)

*Primary Examiner* — Kyle M Lotfi
(74) *Attorney, Agent, or Firm* — BakerHostetler

(57) ABSTRACT

Improved video coding and decoding techniques are described, including techniques to derive quantization step sizes adaptively with quantization step size table templates. Quantization techniques described provide finer-grained control over quantization with a more flexible quantization step size especially at higher degrees of quantization. This may result in improved overall compression quality. Other coding parameters, such as in-loop filtering parameters, may be derived based on the more flexible quantization parameters.

22 Claims, 8 Drawing Sheets

(56) References Cited

U.S. PATENT DOCUMENTS

2016/0073111 A1* 3/2016 Lee .................. H04N 19/124
375/240.03
2022/0279210 A1* 9/2022 Pu .................. H04N 19/172

OTHER PUBLICATIONS

International Patent Application No. PCT/US2021/035879; Int'l Preliminary Report on Patentability; dated Jan. 5, 2023; 9 pages.
International Patent Application No. PCT/US2021/035879; Int'l Search Report and the Written Opinion; dated Aug. 24, 2021; 16 pages.
Xu et al.; "AHG9/AHG15: Chroma QP mapping table cleanups"; Joint Video Experts Team; JVET-R0076-v3; Apr. 15-24, 2020; 11 pages.
Ikonin et al.; "AHG15: Signalling of chroma Qp mapping table"; Joint Video Experts Team; JVET-O0186-v2; Jul. 3-12, 2019; 12 pages.
Pu et al.; "AHG15: chroma quantization parameters Qpc table"; Joint Video Experts Team; JVET-O0433; Jul. 3-12, 2019; 6 pages.

\* cited by examiner

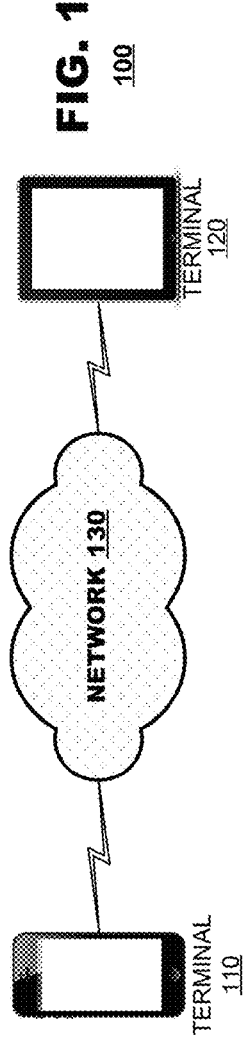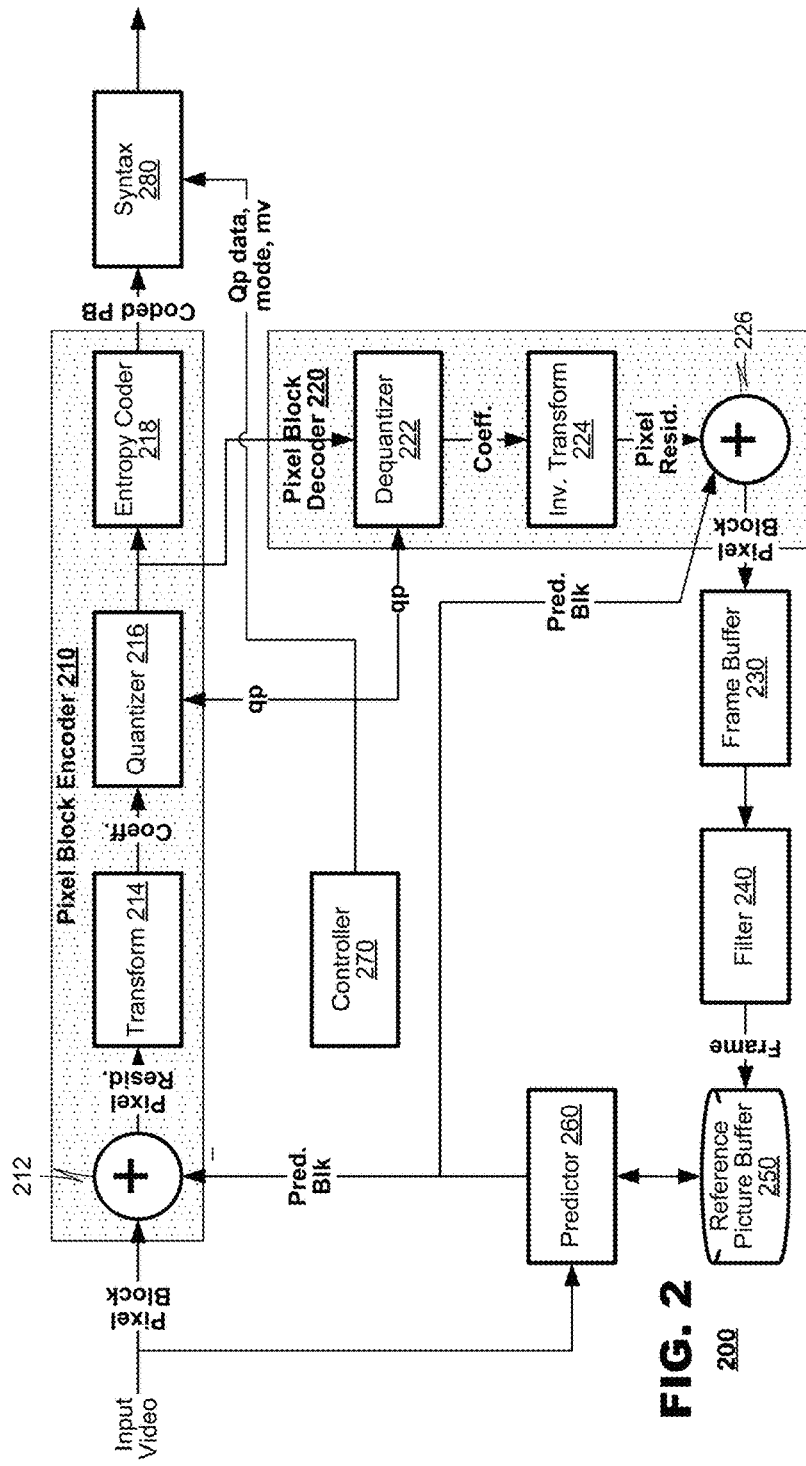

300

500

600

800

900

US 11,936,867 B2

ADAPTIVE QUANTIZER DESIGN FOR VIDEO CODING

CROSS REFERENCE TO RELATED APPLICATIONS

This application claims benefit under 35 U.S.C. § 119(e) of Provisional U.S. patent application No. 63/147,163, filed Feb. 8, 2021, which claims of Provisional U.S. patent application No. 63/042,451, filed Jun. 22, 2020, the contents of which is incorporated herein by reference in its entirety.

BACKGROUND

The techniques proposed in this document relate generally to compression and decompression of image and video data; they are specifically related to quantizer design in video coding. The techniques are not limited to ITU-T/MPEG video codecs, such as the High-Efficiency video coding (HEVC) or Versatile video coding (VVC) standards, or AOMedia Video codecs, such as the AV1 or AV2 standards. In the discussion of the proposed techniques in this document, examples are used based on the current AV1 and draft VVC specification, however, all the proposed techniques can be applied to any other quantizer design, and to different color components (Luma/chroma/Alpha/Depth), bit-depths, etc.

The proposed techniques can also be applied in the area of neural network model compression being explored in MPEG activity namely, compression of neural network for multimedia content description and analysis. In the model coding system, neural network parameters (e.g. model architecture, weights, biases, and other hyper-parameters) instead of video content are compressed. Some existing techniques apply a quantizer design as one of its sub-method to reduce the amount of parameter information that needs to be entropy coded, and all the proposed techniques in this document can also be applied to such quantizer design.

INTRODUCTION

In the AV1 specification, the quantization indices (q_idx) have a data range from 0 to 255 (or 256 in total) indices. Relative to MPEG video coding standards such as MPEG4-AVC, HEVC, and VVC, which have fewer quantization indices, e.g. 52 and 64 for AVC/HEVC and VVC respectively for 8 bit content with an increment of 6 additional quantization indices per each increment in bitdepth precision for a color component, it is observed that AV1 has a finer number of step-sizes (256). However, it is observed that the mapping of these q_idx's to quantization step sizes (q_step) in AV1 has a lower slope compared to AVC/HEVC or VVC as shown in FIG. 7. For example, in VVC the q_step grows exponentially (~pow(q_idx/6,2) i.e. doubles in size every 6 indices). As a result, the q_step is relatively very large at higher q_idx values leading to much lower bitrates. On the contrary, the AV1 step size varies almost linearly at lower q_idx's and increases exponentially at higher q_idx's leading to relatively smaller q_step at higher q_idx. It is also worth noting that AV1 also has a separate mapping of q_idx to q_step for AC and DC coefficients as shown in FIG. 7.

AV1 Specification and Design of Quantization Scheme.

A syntax element "base_q_idx" is encoded at the sequence/frame header to specify the base frame q_idx. The base_q_idx is fixed-length coded with 8 bits. The base_q_idx acts as the base offset for all AC coefficients. For coefficients, other than Luma AC coefficients, additional delta offset can be signaled in the bitstream as discussed below. The Final q_idx is calculated as:

$$\text{Final}\_q\_idx = \text{clip}(0, 255, \text{base}\_q\_idx + \text{delta}) \text{ where}$$

the delta is derived from syntax elements such as DeltaQYDc, DeltaQUDc, DeltaQUAc, DeltaQVDc, DeltaQVAc for Luma DC coefficients, Chroma U DC, Chroma U AC, Chroma V DC, Chroma V AC respectively.

Also, the syntax element "diff_uv_delta" specifies if the same delta is used for chroma U and chroma V components. This q_idx is an index to a lookup table of quantization step sizes.

These techniques lead to several problems:

Reaching lower bitrates: As discussed above, in VVC, the q_step grows exponentially to a very large value at higher q_idx leading to much lower bitrates. On the contrary, AV1 step size varies almost linearly at lower q_idx's and increases exponentially at higher q_idx's leading to relatively smaller q_step at higher q_idx. This has been attributed as one of the reasons AV1 does not achieve low bitrates for some sequences even when it is operating in high q_idx. Also, the DC step size has a lower slope compared to AC and maintain higher precision in DC coefficients. Unlike MPEG standards such as VVC, HEVC which provide flexible signaling of scaling matrices that can extend the step size for each coefficient position, AV1 quant matrices are fixed and they do not have the capability of increasing the DC value further. This also negatively impacts the ability to reach extreme lower bitrates as DC is the most significant component at these bitrates. It is asserted that this observation also depends on the content and the configuration of the frame (intra/inter, prediction, etc.).

Flexible and content adaptive variation of quantization step sizes. It may be observed that coarser or larger quantization step sizes can result in a significant loss in precision for some content characteristics (such as flat areas, fine details, etc.) whereas coarser quantization may be required to achieve lower rates for some other characteristics in the content (such as complex textures, water, etc.).

BRIEF DESCRIPTION OF THE DRAWINGS

FIG. 1 illustrates a simplified block diagram of a video delivery system according to an aspect of the present disclosure.

FIG. 2 is a functional block diagram of a coding system according to an aspect of the present disclosure.

DETAILED DESCRIPTION

Figure 3:
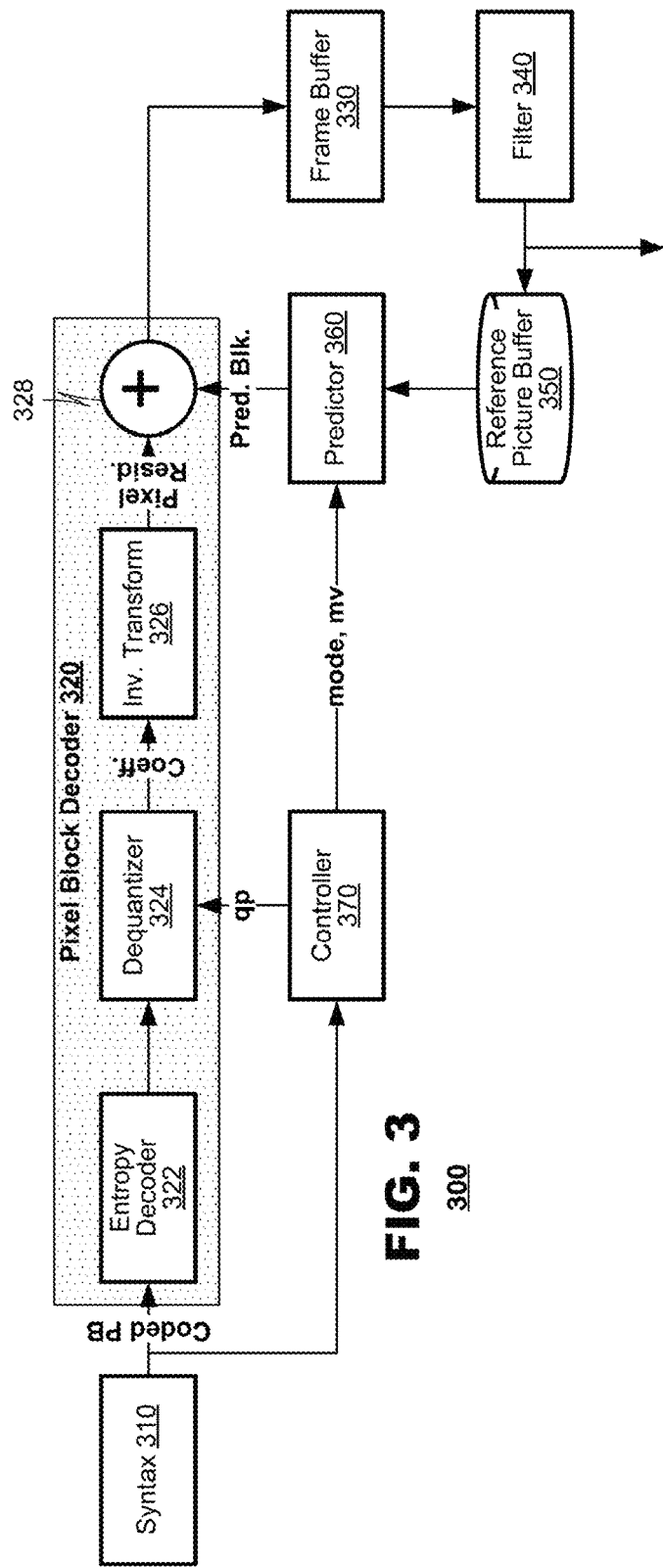
FIG. 3 is a functional block diagram of a decoding system according to an aspect of the present disclosure.

Embodiments of the present disclosure provide techniques to derive quantization step sizes adaptively with quantization step size table templates. These techniques may be used in video coding and decoding devices, as discussed herein. Quantization techniques described provide finer-grained control over quantization with a more flexible quantization step size especially at higher degrees of quantization. This may result in improved overall compression quality particularly at lower bitrates. In some embodiments, other coding parameters, such as in-loop filtering parameters, may be derived based on the more flexible quantization step size.

FIG. 1

FIG. 1 illustrates a simplified block diagram of a video delivery system 100 according to an aspect of the present disclosure. The system 100 may include a plurality of terminals 110, 120 interconnected via a network 130. The terminals 110, 120 may code video data for transmission to their counterparts via the network 130. Thus, a first terminal 110 may capture video data locally, code the video data and transmit the coded video data to the counterpart terminal 120 via the network 130. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via the network 130. The receiving terminal 110 may receive the coded video data transmitted from terminal 120, decode it, and render it locally, for example, on its own display. The processes described can operate on both frame and field frame coding but, for simplicity, the present discussion will describe the techniques in the context of integral frames.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a smart phone and a tablet computer, respectively, but the principles of the present disclosure are not so limited. Aspects of the present disclosure also find application with various types of computers (desktop, laptop, and tablet computers), computer servers, media players, dedicated video conferencing equipment and/or dedicated video encoding equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

FIG. 2

FIG. 2 is a functional block diagram of a coding system 200 according to an aspect of the present disclosure. The system 200 may include a pixel block coder 210, a pixel block decoder 220, a frame buffer 230, an in loop filter system 240, reference picture buffer 250, a predictor 260, a controller 270, and a syntax unit 280. The coding system 200 may operate on predetermined units of video frames, called "pixel blocks" for convenience, to code the pixel blocks differentially according to predictive techniques. Thus, a frame of video to be coded may be parsed into pixel blocks, which the pixel block encoder 210 processes on a pixel block-by-pixel block basis. The pixel block coder 210 may present coded pixel block data to the syntax unit 280, which formats the coded pixel block into a transmission syntax that conforms to a governing coding protocol.

The pixel block decoder 220 may decode the coded pixel block data, generating decoded pixel block data therefrom. The frame buffer 230 may generate reconstructed frame data from the decoded pixel block data. The in-loop filter 240 may perform one or more filtering operations on the reconstructed frame. For example, the in-loop filter 240 may perform deblocking filtering, sample adaptive offset (SAO) filtering, adaptive loop filtering (ALF), maximum likelihood (ML) based filtering schemes, deringing, debanding, sharpening, resolution scaling, and the like. The reference picture buffer 260 may store the filtered frame, where it may be used as a source of prediction of later-received pixel blocks.

The pixel block coder 210 may include a subtractor 212, a transform unit 214, a quantizer 216, and an entropy coder 218. The pixel block coder 210 may accept pixel blocks of input data at the subtractor 212. The subtractor 212 may receive predicted pixel blocks from the predictor 260 and generate an array of pixel residuals therefrom representing a difference between the input pixel block and the predicted pixel block. The transform unit 214 may apply a transform to the sample data output from the subtractor 212, to convert data from the pixel domain to a domain of transform coefficients. In some scenarios (for example, when operating in high dynamic range) prior to transform unit 214 and/or subtractor 212, the input may be reshaped, or an adaptation scheme be applied to adjust to the content transfer characteristics. Such an adaption can be either a simple scaling, based on a re-mapping function, or a more sophisticated pixel manipulation technique. The quantizer 216 may perform quantization of transform coefficients output by the transform unit 214 according to a quantization parameter qp. The quantizer 216 may apply either uniform or non-uniform quantization parameters; non-uniform quantization parameters may vary across predetermined locations of the block of coefficients output from the transform unit 214. The entropy coder 218 may reduce bandwidth of the output of the coefficient quantizer by coding the output, for example, by variable length code words or using a context adaptive binary arithmetic coder.

The transform unit 214 may operate in a variety of transform modes as determined by the controller 270. For example, the transform unit 214 may apply a discrete cosine transform (DCT), a discrete sine transform (DST), a Walsh-Hadamard transform, a Haar transform, a Daubechies wavelet transform, or the like. In an aspect, the controller 270 may select a coding mode to be applied by the transform unit 215, may configure the transform unit 215 accordingly and may signal the coding mode M in the coded video data, either expressly or impliedly.

The quantizer 216 may operate according to a quantization parameter qp that is determined by the controller 270. Techniques for developing the quantization parameter are discussed hereinbelow. The controller 270 may provide data to the syntax unit 280 representing its quantization parameter selections.

The entropy coder 218, as its name implies, may perform entropy coding of data output from the quantizer 216. For example, the entropy coder 218 may perform run length coding, Huffman coding, Golomb coding, Context Adaptive Binary Arithmetic Coding, and the like.

The pixel block decoder 220 may invert coding operations of the pixel block coder 210. For example, the pixel block decoder 220 may include a dequantizer 222, an inverse transform unit 224, and an adder 226. In some scenarios (for example, when operating in high dynamic range) post to inverse transform unit 224 and/or adder 226, the input may be inverse reshaped or re-mapped typically according to a function that was applied at the encoder and content characteristics. The pixel block decoder 220 may take its input data from an output of the quantizer 216. Although permissible, the pixel block decoder 220 need not perform entropy decoding of entropy-coded data since entropy coding is a lossless event. The dequantizer 222 may invert operations of the quantizer 216 of the pixel block coder 210. The dequantizer 222 may perform uniform or non-uniform de-quantization as specified by the quantization parameter data qp. Similarly, the inverse transform unit 224 may invert operations of the transform unit 214. The dequantizer 222 and the inverse transform unit 224 may use the same quantization parameters qp and transform modes as their counterparts in the pixel block coder 210. Quantization operations likely will truncate data in various respects and, therefore, data recovered by the dequantizer 222 likely will possess coding errors when compared to the data presented to the quantizer 216 in the pixel block coder 210.

The adder 226 may invert operations performed by the subtractor 212. It may receive the same prediction pixel block from the predictor 260 that the subtractor 212 used in generating residual signals. The adder 226 may add the prediction pixel block to reconstructed residual values output by the inverse transform unit 224 and may output reconstructed pixel block data.

As described, the frame buffer 230 may assemble a reconstructed frame from the output of the pixel block decoders 220. The in-loop filter 240 may perform various filtering operations on recovered pixel block data. For example, the in-loop filter 240 may include a deblocking filter, a sample adaptive offset ("SAO") filter, and/or other types of in loop filters (not shown).

The reference picture buffer 250 may store filtered frame data for use in later prediction of other pixel blocks. Different types of prediction data are made available to the predictor 260 for different prediction modes. For example, for an input pixel block, intra prediction takes a prediction reference from decoded data of the same frame in which the input pixel block is located. Thus, the reference frame store 250 may store decoded pixel block data of each frame as it is coded. For the same input pixel block, inter prediction may take a prediction reference from previously coded and decoded frame(s) that are designated as reference frames. Thus, the reference frame store 250 may store these decoded reference frames.

The predictor 260 may supply prediction blocks to the pixel block coder 210 for use in generating residuals. The predictor 260 may perform prediction search operations according to intra mode coding, and uni-predictive, bi-predictive, and/or multi-hypothesis inter mode coding. For intra mode coding, the predictor 260 may search from among pixel block data from the same frame as the pixel block being coded that provides a closest match to the input pixel block. For inter mode coding, the predictor 260 may search from among pixel block data of other previously coded frames stored in the reference picture buffer 250 that provides a match to the input pixel block. From among the predictions generated according to the various modes, the predictor 260 may select a mode that achieves the lowest distortion when video is decoded given a target bitrate. Exceptions may arise when coding modes are selected to satisfy other policies to which the coding system 200 adheres, such as satisfying a particular channel behavior, or supporting random access or data refresh policies.

The controller 270 may control overall operation of the coding system 200. The controller 270 may select operational parameters for the pixel block coder 210 and the predictor 260 based on analyses of input pixel blocks and also external constraints, such as coding bitrate targets and other operational parameters. As is relevant to the present discussion, when it selects quantization parameters qp, the use of uniform or non-uniform quantizers, and/or the transform mode M, it may provide those parameters to the syntax unit 280, which may include data representing those parameters in the data stream of coded video data output by the system 200. The controller 270 also may select between different modes of operation by which the system may generate reference images and may include metadata identifying the modes selected for each portion of coded data.

During operation, the controller 270 may revise operational parameters of the quantizer 216 and the transform unit 215 at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 270 may control operation of the in-loop filter 250 and the prediction unit 260. Such control may include, for the prediction unit 260, mode selection (lambda, modes to be tested, search windows, distortion strategies, etc.), and, for the in-loop filter 250, selection of filter parameters, reordering parameters, weighted prediction, etc.

FIG. 3

FIG. 3 is a functional block diagram of a decoding system 300 according to an aspect of the present disclosure. The decoding system 300 may include a syntax unit 310, a pixel block decoder 320, a frame buffer 330, an in-loop filter 340, a reference picture buffer 350, a predictor 360, and a controller 370.

The syntax unit 310 may receive a coded video data stream and may parse the coded data into its constituent parts. Data representing coding parameters may be furnished to the controller 370, while data representing coded residuals (the data output by the pixel block coder 210 of FIG. 2) may be furnished to its respective pixel block decoder 320. The predictor 360 may generate a prediction block from reference data available in the reference picture buffer 350 according to coding parameter data provided in the coded video data. It may supply the prediction block to the pixel block decoder 320. The pixel block decoder 320 may invert coding operations applied by the pixel block coder 210 (FIG. 2). The frame buffer 330 may create a reconstructed frame from decoded pixel blocks output by the pixel block decoder 320. The in-loop filter 340 may filter the reconstructed frame data. The filtered frames may be output from the decoding system 300. Filtered frames that are designated to serve as reference frames also may be stored in the reference picture buffer 350.

The pixel block decoder 320 may include an entropy decoder 322, a dequantizer 324, an inverse transform unit 326, and an adder 328. The entropy decoder 322 may perform entropy decoding to invert processes performed by the entropy coder 218 (FIG. 2). The dequantizer 324 may invert operations of the quantizer 316 of the pixel block coder 210 (FIG. 2). Similarly, the inverse transform unit 326 may invert operations of the transform unit 214 (FIG. 2). They may use the quantization parameters Qp and transform modes M that are identified from the coded video data stream. Because quantization is likely to truncate data, the pixel blocks recovered by the dequantizer 324, likely will possess coding errors when compared to the input pixel blocks s presented to the pixel block coder 210 of the encoder (FIG. 2).

The adder 328 may invert operations performed by the subtractor 210 (FIG. 2). It may receive a prediction pixel block from the predictor 360 as determined by prediction references in the coded video data stream. The adder 328 may add the prediction pixel block to reconstructed residual values output by the inverse transform unit 326 and may output reconstructed pixel block data.

As described, the frame buffer 330 may assemble a reconstructed frame from the output of the pixel block decoder 320. The in-loop filter 340 may perform various filtering operations on recovered pixel block data as identified by the coded video data. For example, the in-loop filter 340 may include a deblocking filter, a sample adaptive offset ("SAO") filter, and/or other types of in loop filters. In this manner, operation of the frame buffer 330 and the in loop filter 340 mimic operation of the counterpart frame buffer 230 and in loop filter 240 of the encoder 200 (FIG. 2).

The reference picture buffer 350 may store filtered frame data for use in later prediction of other pixel blocks. The reference picture buffer 350 may store decoded frames as it is coded for use in intra prediction. The reference picture buffer 350 also may store decoded reference frames.

As discussed, the predictor 360 may supply the prediction blocks to the pixel block decoder 320 according to a coding mode identified in the coded video data. The predictor 360 may supply predicted pixel block data as determined by the prediction reference indicators supplied in the coded video data stream.

The controller 370 may control overall operation of the coding system 300. The controller 370 may set operational parameters for the pixel block decoder 320 and the predictor 360 based on parameters received in the coded video data stream. As is relevant to the present discussion, these operational parameters may include quantization parameters Qp for the dequantizer 324 and transform modes M for the inverse transform unit 310. As discussed, the received parameters may be set at various granularities of image data, for example, on a per pixel block basis, a per frame basis, a per slice basis, a per LCU/CTU basis, or based on other types of regions defined for the input image.

FIG. 4

Figure 4:
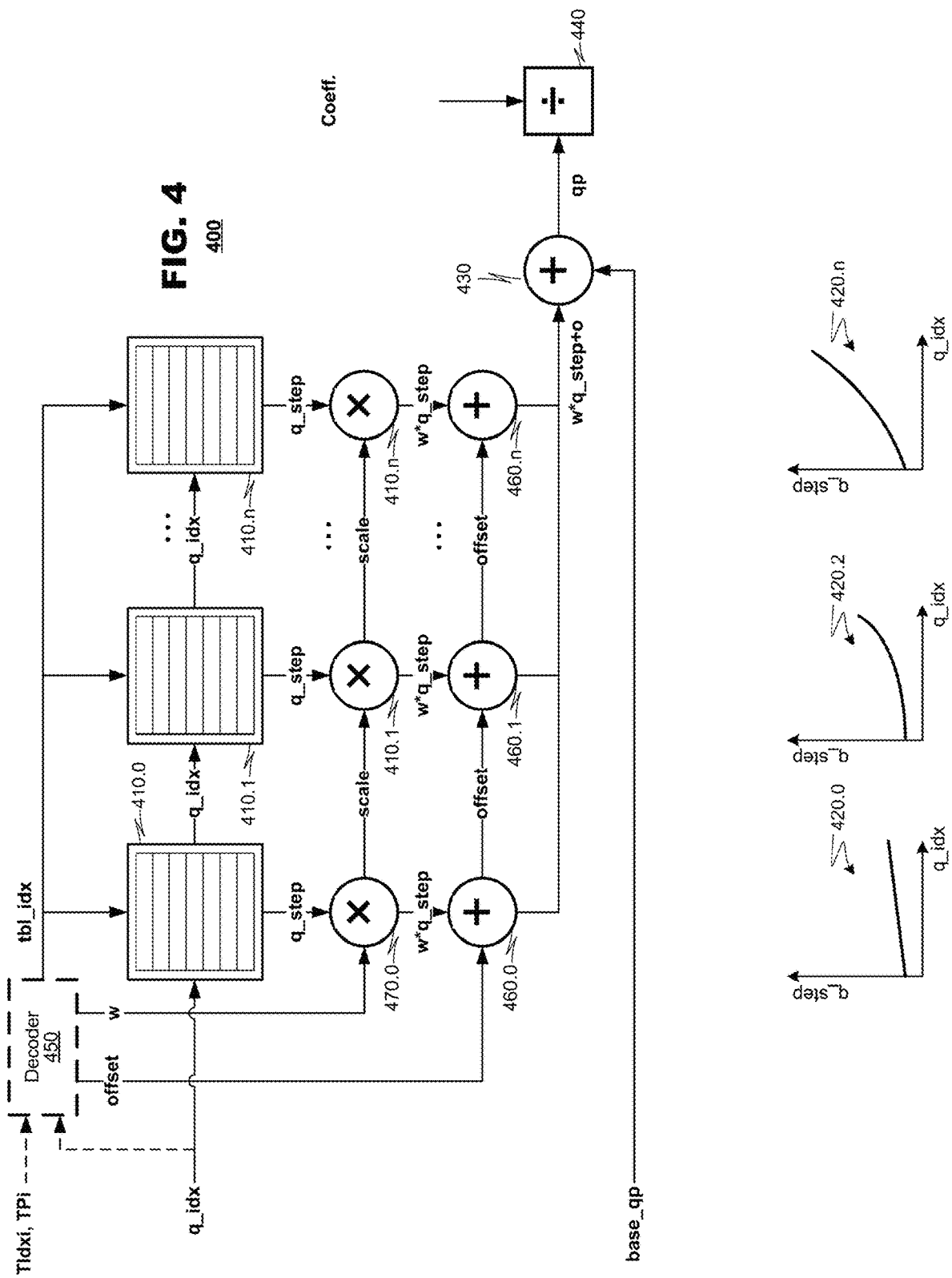
FIG. 4 is a functional block diagram of a quantization selection system according to an embodiment of the present disclosure.
Figure 9:
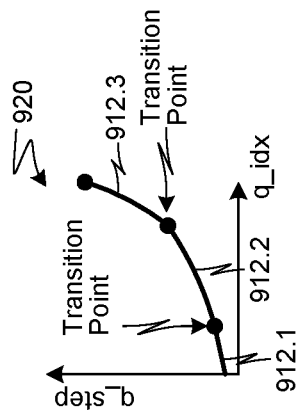
FIG. 9 depicts graphs illustrating example relationships between an index value (q_idx) and a quantization parameter adjustment (q_Step).

FIG. 4 is a functional block diagram of a quantization selection system 400 according to an embodiment of the present disclosure. In an embodiment, video coders and decoders may quantize video according to a plurality of (e.g., N) quantization step size table templates, with each table 410.0, 410.1, . . . , 410.*n* providing its own relationship between an index value (q_idx) and a quantization parameter adjustment (q_Step). The q_Step values stored in these tables 410.0, 410.1, . . . , 410.*n* may be derived empirically or developed according to a predetermined function or formula. For example, q_Step values stored in a first table 410.0 might have a linear relationship such as q_Step=m*q_idx+c (shown in graphs 420.0, 920.0 (FIG. 9)), where m and c are real constants. q_Step values stored in a second table 410.1 may have an exponential relationship such as q_Step=2^q_idx/k (shown in graph 420.1, 920.1). Coding and decoding systems may have as many tables 410.0, 410.1, . . . , 410.*n* with as many mathematical relationships 410.0, 420.1, . . . , 420.*n* between q_idx index values and q_Step quantization step size values as may be desired for a coding application. During coding and decoding operations, encoders and decoders may select from the quantization step size values in the tables 410.0, 420.1, . . . , 420.*n* adaptively to suit instant coding needs.

In a first embodiment, quantization index values may be signaled between a coder and a decoder using a table index (tbl_idx), which identifies a table 410.0, 410.1, . . . , or 410.*n* from which a q_Step value is to be read, and an index value (q_idx) that identifies an entry in the selected table 410.0, 410.1, . . . , or 410.*n* from which the q_Step value is to be read. The q_Step value may be input to an adder 430 along with a base quantization parameter value base_qp to generate a final quantization parameter qp. The final quantization parameter may be input to a quantizer 440, which may be applied to transform coefficients (FIGS. 2, 3) either for quantization or inverse quantization, as the case may be.

In another embodiment, encoders and decoders may derive their own quantization adjustment table on a dynamic basis from quantization step size table templates 410.0, 420.1, . . . , 420.*n*. An encoder may derive a desired quantization adjustment table from the quantization step size table templates 410.0, 420.1, . . . , 420.*n* and signal transition points to a decoder, which may develop a counter-part adjustment table.

In one embodiment, an encoder may signal transition points between tables in ordered signal pairs: $TIdx_i$, $TP_i$. Each instance i of the signal pair may identify a table represented by $TIdx_i$ to be used in a range of quantization indices from a preceding transition point ($TP_{i-1}$) to the quantization index identified by $TP_i$. Specifically, If i=0 then, operating_quant_step_size_table [k]=table_TIdxN0[k], where k ranges from 0 to TP0−1 if (i>0) then, operating_quant_step_size_table [k]=operating_quant_step_size_table [global_transition_point]+table_TIdxNi[k−global_transition_point], where global_transition_point=sum of all number of elements in each $TP_i$'s from 0 to i−1, and k ranges from global_transition_point to $TP_i$.

Consider an example where three signal pairs are provided ($TIdx_i$, $TP_i$), i=0, 1, 2. In such an example, a quantization adjustment table may be derived from q_Step values stored in default quantization adjustment tables 410.0, 410.1, 410.2 (not shown) as follows:

| Quantization Index Range | Source Table |
| --- | --- |
| 0 to $TP_0$−1 | TIdx0 (410.0) |
| $TP_0$ to $TP_0 + TP_1$−1 | TIdx1 (410.1) |
| $TP_0 + TP_1$ to $TP_0 + TP_1 + TP_2$−1 | TIdx2 (410.2) |

In practice and depending on the coding circumstances presented, it may be convenient to join endpoints of segment value ranges extracted from each source table to form a continuous quantization adjustment curve.

FIG. 4 illustrates a decoder 450 that, responsive to the TIdxi, TPi signal pairs, develops table selection signals tbl_idx to select from amongst the quantization adjustment tables 410.0, 410.1, . . . , 410.n in response to quantization index signal q_idx. Once the relationships are established by the decoder 450, quantization parameter qp selections may be made as video data is quantized (encoding) or dequantized (decoding). A quantization index q_idx may be presented to the decoder 450, which generates a table index signal selecting a quantization adjustment table 410.0, 410.1, . . . , 410.n from which the q_step value may be read. The quantization index q_idx also may be presented to the selected table (say, table 410.0) to read the q_step value from the table.

In an embodiment, the system 400 may include adders 460.0, 460.1, . . . , 460.n provided at outputs of the quantization adjustment tables 410.0, 410.1, . . . , 410.n, which may provide additive offsets to q_step values read from the quantization adjustment tables 410.0, 410.1, . . . , 410.n. Offsets may be applied to q_step values read from the quantization adjustment tables 410.0, 410.1, . . . , 410.n as may be desired, for example, to provide a continuous curve among the segments of q_step values read from the quantization adjustment tables 410.0, 410.1, . . . , 410.n at the transition points. Such offsets may be stored in the decoder 450 and output to selected adders 460.0, 460.1 or 460.n when the decoder 450 causes a q_step value to be read from a respective quantization adjustment tables 410.0, 410.1, or 410.n.

In another embodiment, scaling factors may be signaled with transition points, which may be applied as scaling factors to the q_step values read from the quantization adjustment tables 410.0, 410.1, . . . , 410.n. The system 400 may include multipliers 470.0, 470.1, . . . , 470.n, which may apply a scaling weight w to the q_step values read from respective quantization adjustment tables 410.0, 410.1, . . . , 410.n. In such an embodiment, an encoder may transmit signal values as TIdxi, TPi, wi to represent the table (TIdxi) and weight (wi) to be applied to the tables identified by as respective transition point TPi. Such weights may be stored by the decoder 450 and applied to q_step values as determined by a quantization index value q_idx.

Of course, the multipliers 470.0, 470.1, . . . , 470.n and adders 460.0, 460.1, . . . , 460.n may be employed in combination, which allows system designers to define any linear combination of the q_step relationships defined in the quantization adjustment tables 410.0, 410.1, . . . , 410.n that may be desired to suit their individual application needs. Thus, the techniques represented by the system 400 provides wide flexibility to define quantization adjustments dynamically during video coding and decoding operations.

In another embodiment, encoders may signal dynamically created quantization adjustments by defining selections of quantization adjustment tables 410.0, 410.1, . . . , 410.n over ranges of q_idx. In this embodiment, selections may be identified by a transition point, a start index (regionStartNk) can be signaled that essentially defines the region of interest with a particular quant step size template TIdxNk. The default value of this start index (regionStartNk) can be inferred to 0, in which case it operates as described above.

If K=0 then, operating_quant_step_size_table [m]=weightN0*table_TIdxN0[regionStartN0+m], where m ranges from 0 to TP0 if (K>0) then, operating_quant_step_size_table [m]=operating_quant_step_size_table [global_transition_point]+weightNk*table_TIdxNk[regionStartNk+m−global_transition_point], where global_transition§ point=sum of all TPk's from 0 to k−1, and m ranges from global_transition§ point to TPk−1

In a further embodiment, a system 400 may independently derive quant step regions based on signaled quant step size templates as shown below. For all signaled K pairs of (TIdxk, TPk, weightNk, regionStartNk):

If K=0 then, operating_quant_step_size_table [m]=weightN0*table_TIdxN0[regionStartN0+m], where m ranges from 0 to TP0 if (K>0) then, operating_quant_step_size_table [m]=weightNk*table_TIdxNk[regionStartNk+m−global_transition_point], where global_transition_point=sum of all TPk's from 0 to k−1, and m ranges from global_transition_point to TPk−1

As shown above, the foregoing embodiments can adapt the desired q_idx vs q_Step relationship based on content of default quantization adjustment tables 410.0, 410.1, . . . , 410.n and, at the same time, maintain a smooth monotonic relationship. In addition, for multiple tables multiple transition points may be signaled. In a particular embodiment, it is possible that all transition points are at the same distance, and only one value (their distance) is signaled.

The foregoing syntax elements, such as Table Index (tbl_idx), transition points (TPi), weights (wi), start index (regionStartNk) may be signaled separately for all types such Luma DC, Luma AC, Chroma U DC, chroma U AC, Chroma V DC and chroma V AC etc.

FIG. 5

Figure 5:
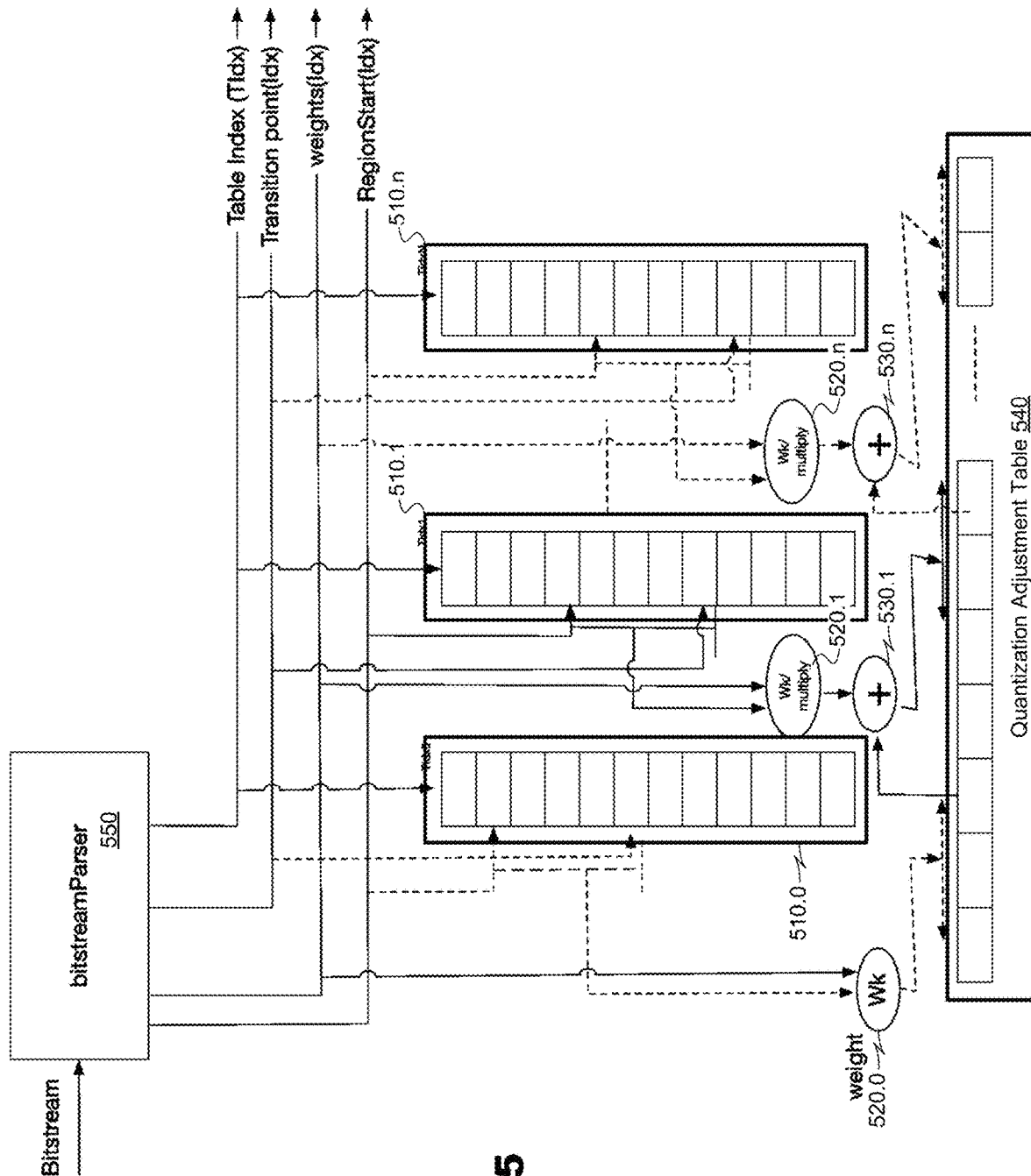
FIG. 5 is a functional block diagram of a quantization selection system according to another embodiment of the present disclosure.

FIG. 5 illustrates another system 500 according to an embodiment of the present disclosure. The system 500 may include a plurality of default quantization adjustment tables 510.0, 510.1, . . . 510.n, multipliers 520.0, 520.1, . . . , 520.n, adders default quantization adjustment tables 530.1, . . . 530.n, a memory 540 for a quantization adjustment table, and a bitstream parser 550. The bitstream parser 550 may receive a data stream that includes transition point identification data and may parse it into constituent data elements (e.g., the table index, transition point, weight, and/or region start data, depending upon the technique being used). The bitstream parser may output these data elements from the system 500.

To construct (or revise) a quantization adjustment table 540, the bitstream parser 550 may output signals to selected ones of the default quantization adjustment tables 510.0, 510.1, . . . , 510.n as identified by transition point data. As discussed, a table index may identify one of the default quantization adjustment tables 510.0, 510.1, . . . , 510.n from which stored q_Step data is to be read. Transition point and/or region start data may identify locations within a selected default quantization adjustment table (say, table 510.1) from which the stored q_Step data is read. When used, weight information may identify scaling factors to be applied by a multiplier 520.1 as q_Step data is read from the default quantization adjustment table 510.1 and stored in the quantization adjustment table 540. An adder 530.1 may add an offset to the q_step values as may be desired to maintain continuity between the q_step values stored from the selected default quantization adjustment table 510.1 and q_step values stored into the quantization adjustment table 540 from a preceding transition point identification. In many (but not all) coding applications, it is desired to ensure that q_step values monotonically increase with increasing values of q_idx. And, although not shown in FIG. 6, adders 530.1, . . . , 530.n may apply offset values that are signaled in the bitstream and identified by the bitstream parser 550.

FIG. 6

Figure 6:
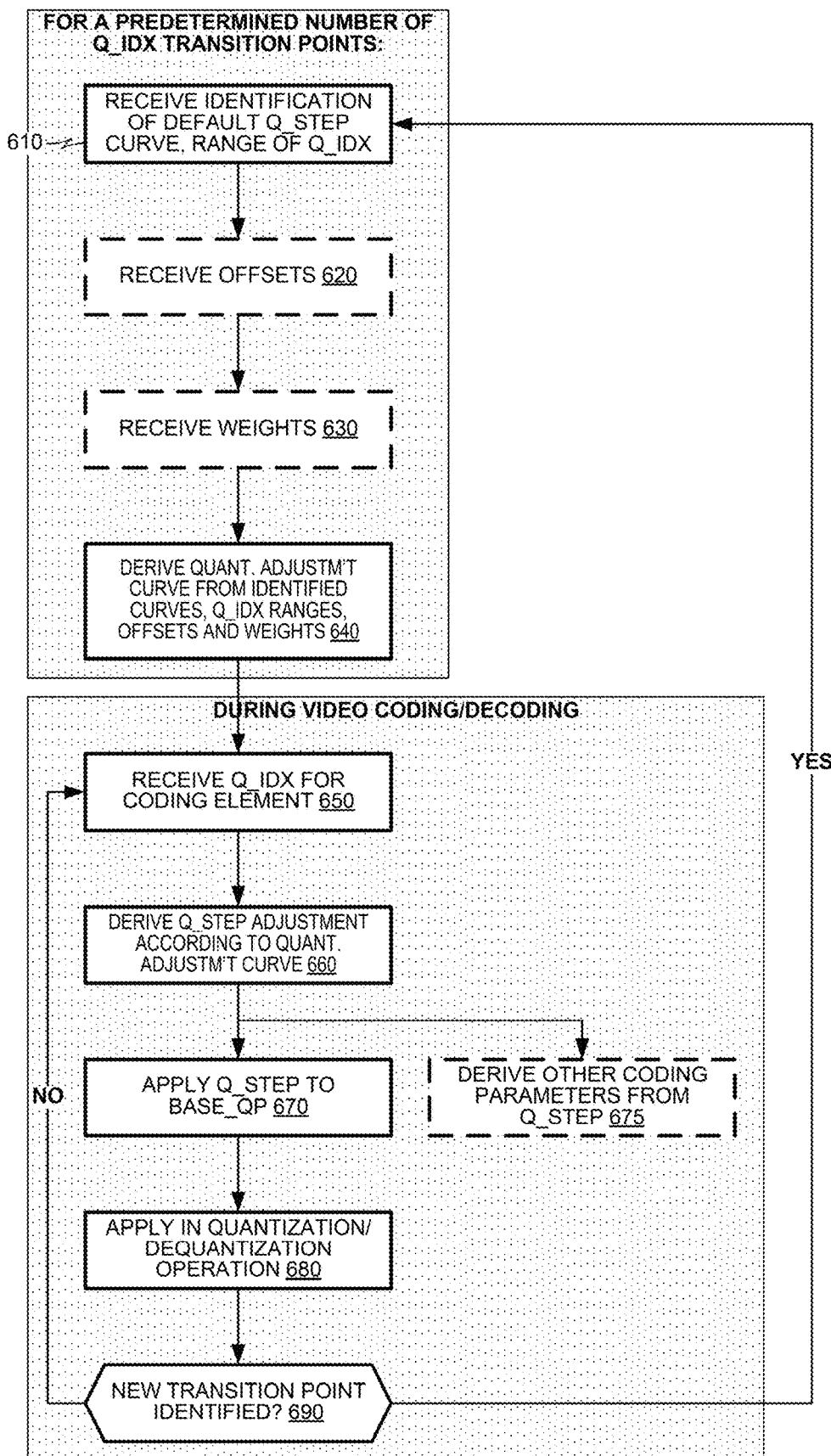
FIG. 6 illustrates a method according to an embodiment of the present disclosure.
Figure 7:
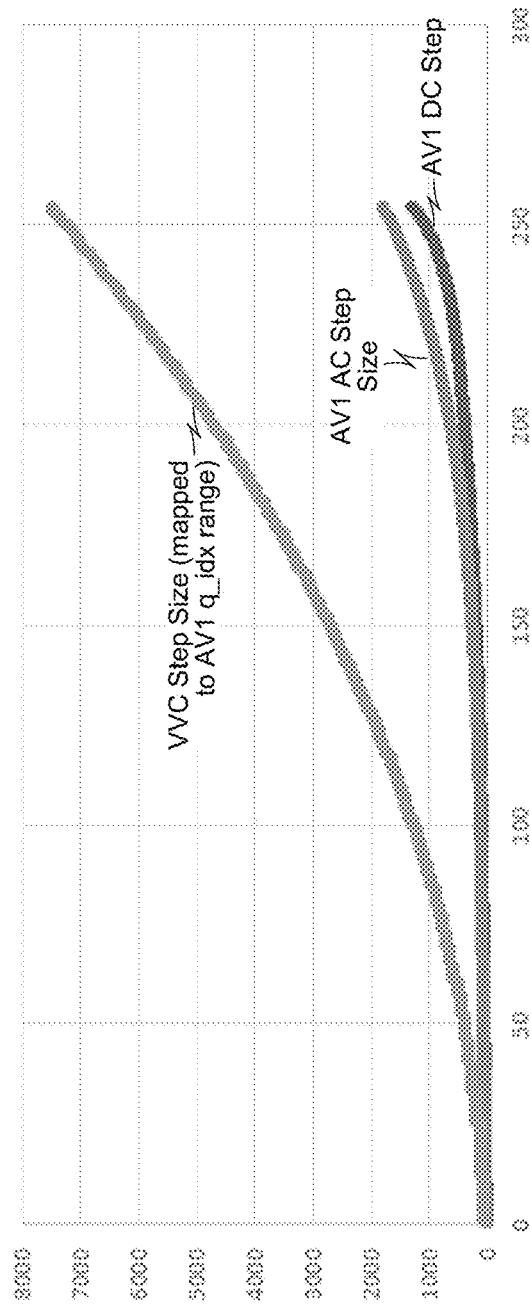
FIG. 7 compares quantizer values supported by several video coding protocols.

FIG. 6 illustrates a method according to an embodiment of the present disclosure. The method 600 may begin upon reception of data identifying transition points, which may include data identifying a default q_step curve and a range of q_idx values to which the transition point applies (box 610). Optionally, the transition point identification may include identification offsets and/or scaling weights (boxes 620, 630). From this transition point identification data, the method 600 may derive a quantization curve (box 640).

Thereafter, the method 600 may be applied during runtime operation of a video encoder or a decoder. When a q_idx value is received for a given coding element (boxes 650), the method 600 may derive a q_step adjustment value according to the quantization adjustment curve derived in box 640 (box 660). The method 600 may adjust a base quantization parameter by applying the q_step value to a base_qp value of the coding element (box 670) and the resultant value may be applied in a quantization operation (for encoding) or a dequantization operation (for decoding) (box 680). The operation of boxes 650-680 may repeat for as long as coding/decoding operations are to be performed or until new transition point data is received (box 690). When new transition point data is received, the method may revise the quantization adjustment curve according to the operation of boxes 610-640.

In operation, revisions of quantization adjustment curves do not require wholesale replacement of transition points previously identified. In an embodiment, revised transition point data may be received with an identification of quantization indices to which they apply. A new quantization adjustment curve may be derived by integrating the new transition point identification with older transition point identifications that apply to other q_idx ranges.

In an aspect, coding parameter other than quantization parameters may also be derived from quantization parameters such as q_step (optional box 675). Coding parameters such as in-loop filtering parameters, inter- and intra-prediction parameters, may be determined in an encoder or decoder based on q_step, as explained in more detail below under Coding Extensions Based on an Improved Quantizer. Any non-quantization coding parameters determined in box 675 may be used in the corresponding encoder or decoder process (not depicted in FIG. 6). For example, the filter strength of an in-loop deblocking filter may be determined based on q_step in box 675, and then the determined deblocking filter strength may be applied in a deblocking filter in encoder filter 240 (FIG. 2) or decoder filter 340 (FIG. 3).

Exemplary Syntax to Support Creation of Quantization Adjustment Tables

Below, an exemplary syntax is provided to illustrate integration of the foregoing techniques into the AV1 coding protocol. While the following example is directed to AV1, as discussed, the principles of the present disclosure may find application in a variety of other coding systems, such as VVC, HEVC, and the like.

Frame quantizer derivation: The function get dc_quant (plane) returns the quantizer value for the dc coefficient for a particular plane and may be derived as follows:
    If plane is equal to 0, return dc_q(get_qindex(0, segment_id)+DeltaQYDc).
    Otherwise, if plane is equal to 1, return dc_q(get_qindex (0, segment_id)+DeltaQUDc).
    Otherwise (plane is equal to 2), return dc_q(get_qindex(0, segment id)+DeltaQVDc).

The function get_ac_quant(plane) may return the quantizer value for the ac coefficient for a particular plane and may be derived as follows:
    If plane is equal to 0, return ac_q(get_qindex(0, segment_id)).
    Otherwise, if plane is equal to 1, return ac_q(get_qindex (0, segment_id)+DeltaQUAc).
    Otherwise (plane is equal to 2), return ac_q(get_qindex(0, segment id)+DeltaQVAc).

The function get_qindex(ignoreDeltaQ, segmentId) may return the quantizer index for the current block, for e.g. "q_Idx" as used in further discussion.

The syntax may include elements as shown below. For simplicity, only relevant syntax elements are shown, and the rest omitted.

A general frame header OBU syntax element may include the following elements:

| General Frame Header OBU Syntax | |
|---|---|
| | TYPE |
| frame_header_obu( ) {<br>  if ( SeenFrameHeader == 1 ) {<br>  ...<br>  }else {<br>  ...<br>  uncompressed_header( )<br>  ... | |

An uncompressed header syntax may include the following elements:

| Uncompressed Header Syntax | |
|---|---|
| | TYPE |
| uncompressed_header( ) {<br>  ...<br>  ...<br>  quantTable_params(0) //Luma AC<br>  separate_Ydc_q_params<br>  if(separate_Ydc_q_params)<br>    quantTable_params(1) //Luma DC<br>  different_chroma_quant_param<br>  if(different_chroma_quant_param) {<br>    separate_uv_quant_param<br>    if(separate_uv_quant_param) {<br>      quantTable_params(2) //Chroma U AC<br>      separate_Udc_q_params<br>      if(separate_Udc_q_params)<br>        quantTable_params(3) // Chroma U DC<br>      quantTable_params(4) //Chroma V AC<br>      separate_Vdc_q_params<br>      if(separate_Vdc_q_params)<br>        quantTable_params(5) // Chroma V DC<br>    } else {<br>      quantTable_params(2)//chroma U and V AC<br>      separate_UVdc_q_params<br>      if(separate_UVdc_q_params)<br>        quantTable_params(3) //chroma U and V DC<br>    }<br>  quantization_params( )<br>  .....<br>  .... | <br><br><br><br>f(1)<br><br><br><br>f(1)<br><br><br><br>f(1)<br><br><br><br>f(1)<br><br><br><br><br>f(1) | where
separate_Ydc_q_params equal to 1 indicates that Luma DC quant table params are separately coded. separate_Ydc_q_params equal to 0, indicates that no separate Luma DC quant table params are signaled and are derived from Luma AC quant table params. If not present, the value is assumed to be zero.

different_chroma_quant_param equal to 1 indicates that chroma (U and V) quant table params are separately coded. different_chroma_quant_param equal to 0, indicates that no separate chroma (U and V) quant table params are signaled and are derived from Luma quant table params. If not present, the value is assumed to be zero.

separate_uv_quant_param equal to 1 indicates that chroma U component and chroma V component quant table params are separately coded. separate_uv_quant_param equal to 0, indicates that no chroma U component and chroma V component quant table params are signaled and are shared. If not present, the value is assumed to be zero.

separate_Udc_q_params equal to 1 indicates that chroma U DC component quant table params are separately coded. separate_Udc_q_params equal to 0 indicates that chroma U DC component quant table params are not separately coded and shared with chroma U AC components. If not present, the value is assumed to be zero.

separate_Vdc_q_params equal to 1 indicates that chroma V DC component quant table params are separately coded. separate_Vdc_q_params equal to 0 indicates that chroma V DC component quant table params are not separately coded and shared with chroma V AC components. If not present, the value is assumed to be zero.

separate_UVdc_q_params equal to 1 indicates that chroma U and chroma V DC component quant table params are separately coded. separate_UVdc_q_params equal to 0 indicates that chroma U and chroma V DC component quant table params are not separately coded and shared with Chroma U AC components. If not present, the value is assumed to be zero.

A quantTable_params header syntax element may include the following information:

| quantTable_params Header Syntax | TYPE |
|---|---|
| quantTable_params(type){ | |
|   num_pivot points[type] | f(3) |
|   for (idx = 0; idx < num_pivot points[type]; idx ++) { | |
|     TableIdx[type][idx] | f(3) |
|     transition_point[type][idx] | f(8) |
|     weights_applied[type][idx] | f(1) |
|     if(weights_applied[type][idx]) { | |
|       weightNrIdx[type][idx] | f(8) |
|       weightDrIdx[type][idx] | f(8) |
|     } | |
|     non_zero_idx_enabled[type] | f(1) |
|     if(non_zero_idx_enabled[type]) { | |
|       regionStartIdx[type] | f(8) |
|     } | |
|   } | |
| } | | where
type represents video content according to the following mapping: type value of 0 is Luma AC, 1 is Luma DC, 2 is chroma U AC, 3, is chroma V AC, 4 is chroma V AC and 5 is chroma V DC.

num_pivot points[type] specifies the number of pivot points used in total to derive the quantization step size table for a particular type.

TableIdx[type][idx] specifies the quant step size template index used to derive the quantization step size table for a particular type and the pivot point index.

transition-point[type][idx] specifies the transition point index to derive the quantization step size table for a particular type and the pivot point index.

weights_applied equal to 1 indicates if the weights are applied for deriving the quantization step size table for a particular type and pivot point index. weights_applied equal to zero indicates the weights are inferred to be equal to 1 If not present, the value of weights_applied is equal to 0.

weightNrIdx specifies the weight numerator value used to derive the quantization step size table for a particular type and pivot point index.

weightDrIdx specifies the weight denominator value used to derive the quantization step size table for a particular type and pivot point index.

non_zero_idx_enabled equal to 1 indicates that a flexible start region within quant step size template's is enabled. non_zero_idx_enabled equal to 0 indicates that a flexible start region within quant step size template's is not enabled and regionStartIdx is inferred to be zero. If not present, non_zero_idx_enabled is inferred to be zero.

regionStartIdx specifies the start index within a particular quantization step size table template used to derive the quantization step size table for a particular type and pivot point index.

Using the foregoing syntax, the quantization step size table may be derived as follows, repeating the process for all types for which a quantization step size table are desired:

```
Local variables may be initialized to zero (e.g., K = 0,
global_transition_point = 0)
for (m = 0; m < transition_point[type][0]; m ++) {
    derived_quant_step_size_table[type][m] = (weightNrIdx[type][0] *
table_TIdx[TableIdx[type][0]][regionStart[type][0] + m])/
weightDrIdx[type][0]
K++
global_transition_point += transition_point[type][0]
While (K < num_pivot points) {
    for (m < transition_point[type][K]; m ++) {
derived_quant_step_size_table [type][m] =
derived_quant_step_size_table[type][global_transition_point] +
(weightNrIdx[type][K] *
table_TIdx[TableIdx[type][K]][regionStart[type][K] + m − global
_transition_point]) / weightDrIdx[type]
}
K++
global_transition_point += transition_point[type][K]
}
```

The final quant step size values for a given q_idx may be derived as derived_quant_step_size table [type][q_idx]

The foregoing syntax finds application in a system in which: quant step size templates have been made available, for example, by signaling them in sequence headers using the techniques described above; the total number of q_idx values are 256, and three color components (Y, U, V) are present in the header. Of course, the principles of the present disclosure find application to systems that use a different number of q_idx values and to other components (alpha, depth etc.) as well as sub-set of the components (such as monochrome etc.) as may be desired.

The following discussion presents an exemplary application of the foregoing quantization curve derivations. Consider an example where it is desired to have two quantization adjustment tables 410.0, 410.1, one that is fully linear and another table that is exponentially varying.

The linear quant step-size table 410.0 can be, for example, derived as q_step=clip(DESIRED_MIN, DESIRED_MAX, m*q_idx+c), where m and c are some real constants and DESIRED_MIN, DESIRED_MAX are the desirable min and max value of quant step size respectively.

The exponentially varying quant step-size table 410.1 can be, for example, derived as q_step=clip(DESIRED_MIN, DESIRED_MAX, ROUND(24*(2^(q_Idx/16)+k))), where k is some real constants and DESIRED_MIN, DESIRED_MAX are the desirable min and max value of quant step size.

In such an application, a system 400 may signal a "transition point" such as "linear_table_max_idx" that specifies the transition from linear table to exponential table.

```
If ( k < linear_table_max_idx ) then final_q_step_table[k] =
    linear_q_step_table[k]
else final_q_step_table[k] =
linear_q_step_table[linear_table_max_idx] +
    exponential_q_step_table[k - linear_table_max_idx]
```

The linear_table_max_idx or "transition point" can be signaled differently for AC or DC component.

The linear_table_max_idx or "transition point" can be signaled differently for Luma, chroma U, and chroma V component.

The linear_table_max_idx or "transition point" can be signaled differently for different bit-depths.

Signaling of "transition point" can be signaled at different levels of granularity—Sequence, Frame, Slice, tile or block header. Each level of signaling might have different trade-offs.

In application, data for multiple N quantization adjustment curves can be signaled at a sequence or frame granularity (to minimize coding cost) and the index corresponding to a selected one of those quantization adjustment curves can be signaled at lower granularity such as block-level, slice-level, segment-level, tile-level or specific region-level within a frame to achieve the desired adaptivity. It may be noted that the signaling granularity can provide different complexity, compression efficiency, and adaptivity trade-offs. In general, signaling at the lowest granularity is computationally intensive for hardware implementations and also can incur more coding cost. However, it can provide maximum flexibility or adaptivity for making coding decisions, especially for low bitrate applications. Similarly, the signaling for quantization step size index, transition points, weight at transition points, and region of interest within the quant step size index can be signaled at various granularities such as block-level, slice-level, segment-level, tile-level or specific region-level, frame level or sequence level. For such data, signaling at lower granularity provides significant flexibility and content based adaptivity.

The foregoing discussion has presented quantization adjustment in the context of unitary q_step values and base_qp values. The foregoing techniques may be applied to multi-dimensional quantization matrices, where the quantization adjustment curves are defined as quantization adjustment matrices having quantization adjustment values that vary according to transform coefficient being processed (e.g., for a DC coefficient and for the multiple AC coefficients generated by a transform unit 214 (FIG. 2)) and also by q_idx. Data for such quantization adjustment matrices can be signaled explicitly in the sequence or frame header. An index corresponding to a quantization matrix from those "N" quantization adjustment matrices may be supplied for a coding element being processed.

In another embodiment, a pivot method may be applied to signal quant step size tables and scaling matrices. A system 400 may specify N indices (using deltas to ensure that they are monotonically increasing) and then use an interpolation method to interpolate missing indices. The interpolation could simply be bilinear or could use a more complex model (e.g. bicubic). Such a technique could be combined with a piecewise method, for example, where one segment uses interpolation and a next segment uses the function. Such a technique provides control over the precision of quantization in a fine manner and using defined step sizes. DC/AC quantization could use similar tactics as well as quantization matrices. By signaling quantization matrices using an interpolation (e.g. pivot based) method, the high signaling cost associated with quantization matrix signaling may be reduced. In this approach, a system 400 may signal the values of certain points, which could be prefixed in position or their position is explicitly signaled (in the latter case, it may be preferable to employ uniformly spaced points for all transform types). For different transform types different points could be signaled or the points at the corresponding "scaled" position are only indicated as pivot points. Then the quantization scale for the intermediate missing points is interpolated using a specified method, e.g. using bilinear interpolation applied horizontally and/or vertically.)

In an embodiment, a system 400 may signal multiple quantization matrices at each stage (e.g. SPS) and therefore making this more flexible. At the PPS a design has the option to indicate which quantization matrix (or matrices) in the SPS it prefers to use by indicating their index. This avoids the costly signaling of different quantization matrices multiple times since only an index would need to be signaled. Furthermore, at the slice/tile level an index to the PPS quantization matrix list can be further used to allow further control and flexibility of the quantization scaling matrices to be used within a region. This could even be extended at the block level. Mechanisms of predicting between quantization matrices could also be used, i.e. instead of signaling the entire table, delta from a reference table could be used or a quantization matrix in one PPS could be predicted from the quantization matrices indicated in the SPS or from another, previously transmitted PPS. It may also be possible to indicate a different structure, e.g. a new NAL unit type such an adaptation NAL unit type, that is of higher importance than a PPS and which contains all possible quantization matrices from which a PPS can predict from. In that case, a decoder or transmission system can more easily determine the relationships between different unit types in a stream for purposes of channel switching, random access, etc. A PPS or APS could also populate a reference buffer of quantization matrices, that also could be utilized for the prediction of such elements. Basically, this functionality of predicting quantization matrices in the PPS from other previously signaled elements or structures, can be seen as a form of "inter" prediction of quantization matrices. Spatial/intra prediction of quantization matrices is also possible, i.e. if the PPS is allowed to contain multiple quantization matrices, a quantization matrix may be coded in a predictive manner compared to an earlier quantization matrix that was signalled in the PPS.

In a further embodiment, a system 400 may control the number of quant indices signaled, both at the frame/tile level (there the cost is less so maybe a fine number of indices is okay) and at the block level (basically we are indicating a "quantized quantization step size increment")). For example, we may have still 256 or maybe 128 quant steps at the picture level, but at the block level we can indicate the delta offset at increments of N, e.g. N=2 or 4 instead of 1. This could also apply to AC and chroma. More specifically, qpIdx at the block level can be derived as: block_qpIdx=base_q_idx+qp_delta*quant_qp_delta.

In the existing implementation of VVC, HEVC, and AV1 standards, the quant matrices are commonly derived based on the transform block size, prediction type and color component of the block and generally are fixed for all QPs but can differ for different transform sizes, prediction modes, and colour component. In an embodiment, a system 400 may provide flexibility of controlling and adjusting the quant matrices based also on the QP. That is, instead of using a single quant matrix for a particular prediction and block type, the system 400 also may switch quant matrices based on QP or QP range. A different matrix may make more sense for a low vs a moderate, vs a high QP. As an extension, the matrix itself could have terms that are adjusted based on the QP value being used.

The foregoing discussion has presented adjustment of quantization values along a single range of quantization indices, represented as q_idx. In practice, it may be desirable to provide different instantiations of the system 400 (FIG. 4) and method 500 (FIG. 5) for different types of data. For example, different instantiations may be provided for luma data than for chroma data. Different instantiations may be provided for standard dynamic range (SDR) video than for high dynamic range (HDR) video. Different instantiations may be provided based on the bit depth used to represent video data (e.g., 8-bit color, 10-bit color, or 12-bit color). Different instantiations may be provided for different types of transform coefficients (e.g., for DC coefficients than for AC coefficients). The number and types of instantiations may be selected by system designers as they apply the foregoing techniques to their individual needs.

In a further aspect, quantization values may themselves be quantized prior to transmission between encoder and decoder. In many applications, quantization parameters of pixel blocks are represented as a delta_qp value, which represents a change over a base quantization parameter provided elsewhere in a coding syntax (e.g., a final_qp=base_qp+delta_qp). In a further embodiment, it may be valuable to provide the delta_qp as a value that is quantized over a quantizer quantization parameter q_qp such that a final_qp=base_qp+q_qp*delta_qp. The quantizer quantization parameter q_qp may be signaled in a higher-level syntactic element. It is estimated that, in many coding applications, signaling of the delta_qp value can consume 6-8% of coding bandwidth and, therefore, quantization of the delta_qp value can achieve significant reductions in coding bitrate.

In a further aspect, multiple quantization step size tables may be generated (using any combination of the methods discussed in this document) to capture the pixel reshaping characteristics. It is possible that, the adjacent regions may follow different pixel reshaping characteristics or reshaping "mode". To allow flexible use of quantization step size table, it is further proposed to signal the quantization step size table to be used for that particular region (considering the reshaping characteristics/mode) that provides the best trade-off between quality, compression efficiency and complexity. The region could be at various granularity such as block, slice, tile, segment and/or frame or sequence-level etc.

Dynamic Creation of Quantization Adjustment Curves

In some aspects, creation of a set of quantization adjustment curves (such as tables 410.0 to 410.n of FIG. 4) may be controlled by a quantization step mode selection (qStep_mode). A selected quantization step mode may be signaled in a compressed bitstream, along with any parameters necessary construct the set of quantization curves in the selected mode.

For example, a set of quantization curves may be created according to one of the following candidate quantization step modes:

a. qStep_mode=0 may indicate that a set of default quantization adjustment curve is predetermined and fixed. In this case, no further information need be signaled in a compressed bitstream to construct the predetermined quantization adjustment curves, and hence quantization step mode parameters may not be needed.

b. qStep_mode=1 may indicate that a quantization adjust curve is created in an identified number of intervals whose lengths are related to each other by a predetermined relationship. For example, intervals may be defined to have a length that increases according to a power of 2 relationship (e.g., 8, $8*2^0$, $8*2^1$, $8*2^3$) across an available number of quantization indices ($q_{idx}$). Quantization adjustment values may be developed within each interval according to a variety of means. In one example, a default table may be provided with predetermined quantization adjustment values; the table values may be extended across each interval by scaling table values according to each interval's length and applying an offset according to the highest quantization adjustment value of a preceding interval. The default table may contain quantization adjustment values that increase by index value according to a desired profile, such as by an exponentially increasing profile. Alternatively, the default table may contain quantization adjustment value that increase linearly by index value. In this example, quantization step mode parameters might include the number of curves (NumTransistionInterval_minus1), and a number of quantization step entries (numOstepsinInterval) in a table specifying each curve.

c. qStep_mode=2 may indicate that a first quantization adjustment curve is signaled, and the other quantization adjustment curves are created by replicating the signaled first curve. In this example, quantization step mode parameters may include the number of quantization step size entries in a table defining the signaled first curve, and the quantization step size values of each entry in the table defining the signaled first curve.

d. qStep_mode=3 may indicate that each quantization adjustment curve is explicitly signaled. For example, each curve could be defined by a table, and each table may be signaled. In this example, quantization step mode parameters may include a number of tables, and then for each table, a number of entries in that table along with a list of quantization step sizes in each table.

A design including selectable quantization step modes may provide several advantages:

a. Transition Interval type: An interval window may be considered as a segment of the curve. It may be beneficial to have interval windows that either are fixed and variable. A variable quantization mode selection scheme provides flexibility to a coding system.

b. Symmetry across Transition intervals: In one implementation, Q-steps may double after each interval (e.g. Q-step of Nth interval is twice the corresponding Q-step from N-lth interval). A variable quantization mode selection scheme provides may leverage implicit signaling to exchange Q-step information between coder and decoder thereby increasing coding efficiencies in such systems.

c. Exponential (especially power of 2) derivation of interval length: In an implementation, for example, interval lengths may double after each interval (e.g. the lengths of a $N^{th}$ interval is twice the N-$1^{th}$ interval). A variable quantization mode selection scheme provides may leverage implicit signaling to exchange interval information between coder and decoder, again, increasing coding efficiencies in such systems.

Sometimes, it may be desirable to have an exponential (specifically power of 2) mapping of the qIdx to Qstep. The powers of two can be realized more efficiently through shift operations without need division operation. When implemented in hardware processing circuitry, division operations often are expensive mathematical operations to perform.

| Interval window Type | Symmetry across Transition intervals (doubles for every interval) | Step size derived as power-of-2 curve) | QStepMode |
|---|---|---|---|
| Fixed | Yes | Yes | 0 |
| Interval size | Yes | Not necessary | 2 |
| Variable | Yes | Yes | 1 |
| Interval size | Not necessary | Not necessary | 3 |

An example syntax for a sequence header for above four quantization step modes:

| | |
|---|---|
| sequence_header_obu( ) { | |
| seq_profile | f(3) |
| still_picture | f(1) |
| .... | |
| qStep_mode < > | f(2) |
| if (qStep_mode == 1) { // fully exponential with flexible steps | |
|     NumTransitionInterval_minus1 | f(4) |
|     for(i = 0; i < NumTransitionInterval_minus1; i ++) { | |
|         numQstepsInInterval[i] | uvlc( ) or f(8) |
|     } | |
| } else if (qStep_mode == 2) {//Signal offset for one interval and replicate | |
|     num_q_step_periods_minus1 | f(3) |
|     for (i = 0; i <= (log2_num_q_step_periods_minus1); i++) { | |
|         delta_level_scale[ i ] | uvlc( ) or f(8) |
|     } | |
| } else if (qStep_mode == 3) { //explicit signaling of template tables and combination of flexible steps | |
|     numTableTemplates | f(2) |
|     for (i = 0; i < numTableTemplates; i++) { | |
|         numEntriesInTable | f(8) |
|         for (idx = numEntriesInTable −1; idx >=0; idx ++) { | |
|             DeltaqStepVal[idx] | uvlc( ) or f(8) |
|         } | |
|     } | |
|     NumTransitionInterval_minus1 | f(4) |
|     for (i = 0; i < NumTransitionInterval_minus1; i ++) { | |
|         TemplateTableIdx[i] | f(2) |
|         numQstepsInInterval [i] | uvlc( ) or f(8) |
|         TableStartRegionIdx[i] | uvlc( ) or f(8) |
|     } | |
| } | |

In an aspect, a qStep_mode may specify the selected mode of qStep derivation. qStep_mode=0 specifies that the table in Section 1.1 is used for current sequence. qStep_mode=1 and q qStep_mode=2 specify the method to derive the qStep values as in Section 1.2 and section 1.3. qStep_mode=3 is not specified. When not present, the value of qStep_mode is inferred to be zero.

In other aspects, signaling of quantization curves need not be done in a sequence header, and may instead be done at different frequencies within a compressed bitstream or at different levels of granularity. This may be done by specifying the quantization adjustment curves at different layers of syntax in the bitstream. For example, quantization curve signaling may be done at in a sequence layer, tiles layer, etc. Similarly, in MPEG standards (e.g. VVC) they could be in sequence, picture, sub-picture, slice or tile headers.

The following discusses exemplary techniques to generate quantization curves using the foregoing sequence header syntax and with examples of pseudocode qStep_mode=0

In a first example, qStep_mode=0, which applies a predefined granularity of qStep sizes. In this example, the Interval window Type is set to fixed, the transition intervals double for every interval, and the step size is derived as power-of-2 curve. This implementation allows a quantization table to be defined in an interface specification, which provides a set of default values for coding applications where it is unnecessary to specify values of a quantization table expressly. The values of NumTransitionInterval_minus1 may be inferred between devices to be equal 9 and numQstepsInInterval for each transition interval may be inferred to be equal to 8, 8, 16, 32, 32, 32, 32, 32, 32, 32. In this example, the values of NumTransitionInterval_minus1 and numQstepsInInterval are derived when the qStep_mode value is set to 0.

```
Qstep[0] = 32; qIdx = 1;
Initial_qIdx_factor = 32;
for(int i = 0; i <= NumTransitionInterval && qIdx < 256; i++) {
    int idx = 1;
    int log_val = setLog(NumQstepsInInterval[i]);
    while (idx <= NumQstepsInInterval[i]) {
        int Qstep[qIdx] = (Initial_qIdx_factor *
((NumQstepsInInterval[i]) + (idx % NumQstepsInInterval[i]))) << (idx >> log_val))) >> log_val;
        qIdx++;
        idx++;
    }
    Initial_qIdx_factor = Qstep[qIdx−1];
}
``` qStep_mode=1

In another example, qStep_mode=1, which permits an encoder to define a flexible quantization table with flexible quantization steps. In this example, the interval window type is variable, Symmetry across Transition intervals=doubles for every interval, and the step size is derived as power-of-2 curve. This implementation provides flexibility to define the accuracy of Q-step at the operating bit-rate range. For example, when operating at higher QP's, finer step size around the operating QP can be defined, which helps reduce quantization errors and abrupt transitions in coding quality during coding sessions.

In this example, an encoder may provide signaling as follows:

NumTransitionInterval_minus1–the value plus 1 specifies the number of intervals in the Qstep range of 256, for which a number of qsteps in interval is signaled.

NumQstepsInInterval[i]–number of qStep points within a 'i' th transition interval.

When a NumQstepsInInterval is not signaled for the 'i' th transition interval, the NumQstepsInInterval is inferred to equal to 32.

The value of transition NumQstepsInInterval[NumTransitionInterval_minus1] is inferred to be 256−sum of NumQstepsInInterval[0] to NumQstepsInInterval[NumTransitionInterval_minus1]. Often, in practice, the sum of NumQstepsInInterval[0−NumTransitionInterval_minus1] will be less than 256.

In an aspect for qStep_mode=1, NumQstepsInInterval may be set as power of 2 and a Q-step table may be derived as follows:

```
Qstep[0] = 32; qIdx = 1;
    Initial_qIdx_factor = 32;
    for(int i = 0; i <= NumTransitionInterval && qIdx < 256; i++) {
        int idx = 1;
        int log_val = setLog(NumQstepsInInterval[i]);
        while (idx <= NumQstepsInInterval[i]) {
            int Qstep[qIdx] = (Initial_qIdx_factor *
((NumQstepsInInterval[i] + (idx % NumQstepsInInterval[i])) << (idx >> log_val))) >> log_val;
            qIdx++;
            idx++;
        }
        Initial_qIdx_factor = Qstep[qIdx−1];
    }
```

In another aspect for qStep_mode=1, which may be suitable for methods that can operate at floating point precision, a Q-step table may be derived as follows:

```
qIdx = 0
base_qIdx_transition = 1
Initial_qIdx_factor = 32.
for(int i = 0; i <= NumTransitionInterval; i++) {
    int idx = 0;
    while (idx < NumQstepsInInterval[i]) {
        Qstep[qIdx] = int(Initial_qIdx_factor * (double) pow(2,
(double)(qIdx − (base_qIdx_transition − 1))/ NumQstepsInInterval[i]));
        qIdx++;
        idx++;
    }
    base_qIdx_transition = qIdx;
    Initial_qIdx_factor = Qstep[qIdx−1];
}
```

Alternatively, the precision of the variables (e.g qIdx−(base_qIdx_transition−1)) can be increased by multiplying or shifting by a large value and before division to increase the accuracy after the division.

In an aspect for qStep_mode=1, numQstepsInInterval may be delta coded from the previous interval with variable length code, and the values of Initial_qIdx_factor can be signaled in the bitstream in some implementations.

qStep_mode=2

In a further example, qStep_mode=2, which permits an encoder to signal offsets for one interval and replicate the interval to generate additional intervals:

```
//compute level_scale [i] from delta_level_scale [i],
for (i = 1; i <= (log2_num_q_step_periods_minus1); i++)
    level_scale [ i ] = level_scale [ i − 1 ] + delta_level_scale[ i ]
// compute NumTransitionInterval.
NumTransitionInterval = (256/(num_q_step_periods_minus1+1)) + 1;
//256 can be another other number equal to number of step sizes in the standard
//compute quantization step size table Qstep[ ]
qIdx = 0
Initial_qIdx_factor = 1.
for(int i = 0; i <= NumTransitionInterval; i++) {
    int idx = 0;
    while (idx < NumQstepsInInterval[i]) {
        Qstep[qIdx] = (int(Initial_qIdx_factor * level_scale [i]) << i);
        qIdx++;
        idx++;
    }
}
``` qStep_mode=3

In yet another example, qStep_mode=3, which permits a coding system to explicitly signal a QstepTableTemplate and derive a QstepTable from the QstepTableTemplate. In this example, a set of tables may be signaled, which act as a template. A final table to be used for that sequence may be derived as a combination of QstepTableTemplates. In the exemplary discussion that follows, a first 64 entries from table 1 and next 196 entries from table 2.

```
If K = 0 then,
QStepDerived [0 to numQstepsInInterval[k]] =
TemplateTableIdx[k] [TableStartRegionIdx[k] to TableStartRegionIdx[k]+ numQstepsInInterval[k]]
QStepIdx = QStepIdx + numQstepsInInterval
else if (K > 0) then,
QStepDerived [QStepIdx to numQstepsInInterval[k]] =
QStepDerived [QStepIdx − 1] +
TemplateTableIdx[k][TableStartRegionIdx[k] to TableStartRegionIdx[k]+ numQstepsInInterval[k]],
Where QStepIdx = QStepIdx + numQstepsInInterval
```

FIG. 8

Figure 8:
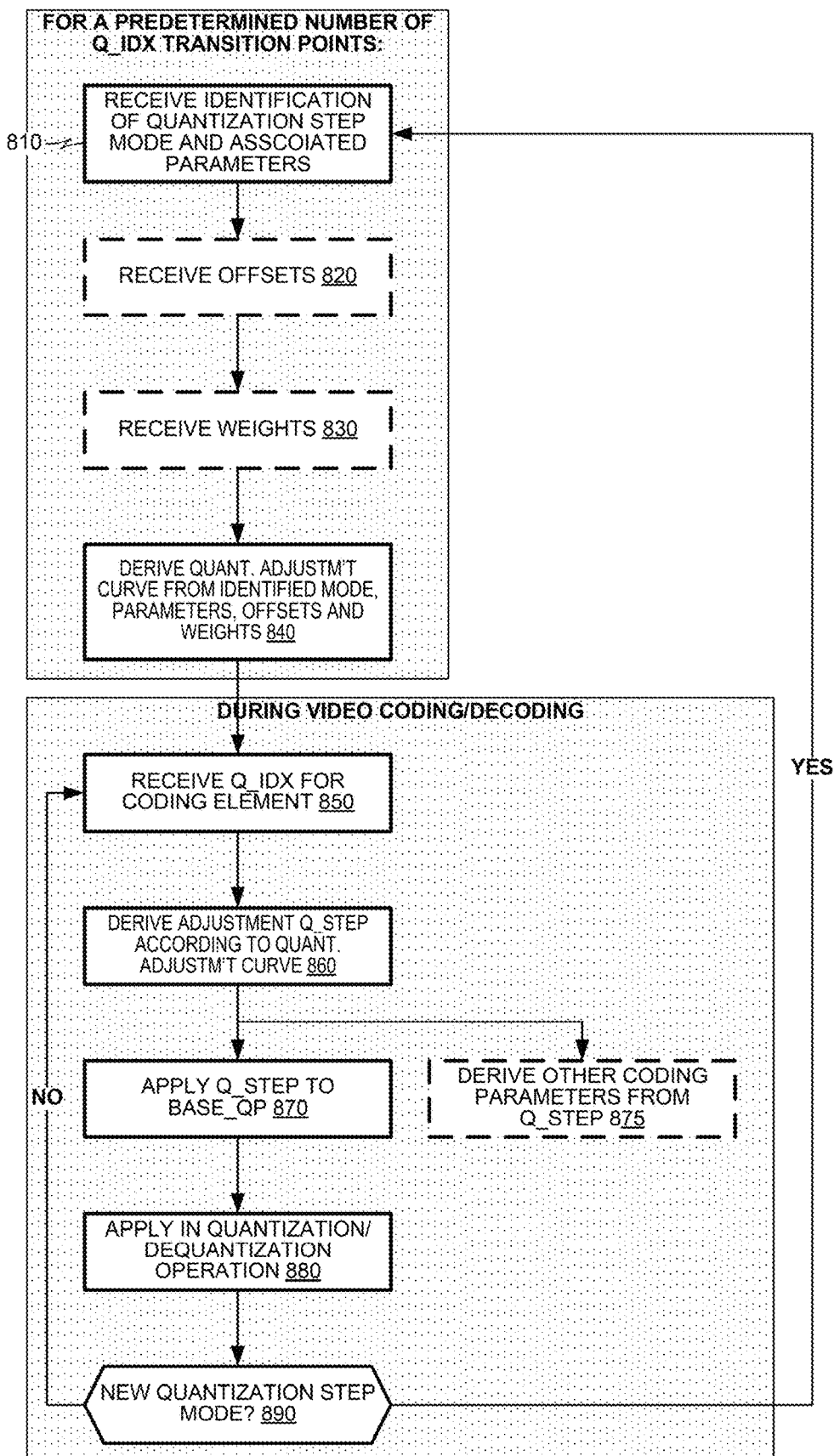
FIG. 8 illustrates a method according to an embodiment of the present disclosure with a quantization step mode.

FIG. 8 illustrates a method according to an embodiment of the present disclosure with a quantization step mode. The method 800 may begin upon reception of data identifying a selected quantization step mode and parameters associated with the selected quantization step mode. The parameters associated with the selected quantization step mode may enable derivation of a set of quantization adjustment curves, and may include data for a number of transition points, as explained above (box 810). Optionally, the transition point identification may include identification offsets and/or scaling weights (boxes 820, 830). From the selected quantization step mode and any associated parameters, the method 800 may derive a quantization curve (box 840).

Thereafter, the method 800 may be applied during runtime operation of a video encoder or a decoder. When a q_idx value is received for a given coding element (boxes 850), the method 800 may derive a q_step adjustment value according to the quantization adjustment curve derived in box 840 (box 860). The method 800 may apply the q_step value to a base_qp value of the coding element (box 870) and the resultant value may be applied in a quantization operation (for encoding) or a dequantization operation (for decoding) (box 880). The operation of boxes 850-880 may repeat for as long as coding/decoding operations are to be performed or until a new quantization step mode or associated parameters are received (box 890). When a new quantization step mode or new parameters associated with a quantization step mode are received, the method may revise the quantization adjustment curve according to the operation of boxes 810-840.

In operation, revisions of quantization adjustment curves do not require wholesale replacement of transition points previously identified, as explained below regarding prediction of quantization adjustment curves. In an embodiment, revised transition point data may be received with an identification of quantization indices to which they apply. A new quantization adjustment curve may be derived by integrating the new transition point identification with older transition point identifications that apply to other q_idx ranges.

In an aspect, coding parameters other than quantization parameters may also be derived from quantization parameters such as q_step (optional box 875). Coding parameters such as in-loop filtering parameters, inter- and intra-prediction parameters, may be determined in an encoder or decoder based on q_step, as explained in more detail below under Coding Extensions Based on an Improved Quantizer. Any non-quantization coding parameters determined in box 875 may be used in the corresponding encoder or decoder process (not depicted in FIG. 8). For example, the filter strength of an in-loop deblocking filter may be determined based on q_step in box 875, and then the determined deblocking filter strength may be applied in a deblocking filter in encoder filter 240 (FIG. 2) or decoder filter 340 (FIG. 3)

Alternate Sets of Quantization Adjustment Curves and Prediction

Different portions of coded video may use alternate sets of quantization adjustment curves. For example, one set of quantization adjustment curves, such as is described above in a sequence header for four quantization step modes, are combined to create a new quantization adjustment curve for use during quantization or inversion quantization of all image data in a video sequence. In other examples, different sets of quantization curves may be defined in a compressed bitstream for DC and AC coefficients, for luma and chroma data, or for I-frame, P-frame, or B-frames.

In an aspect, a coding system may signal an initial_Q_Step index, a first element of a Q_Step, explicitly.

When alternate sets of quantization adjustment curves are included in a compressed bitstream more than once, the bit cost of specifying the adjustment curves may be reduced by predicting one set of adjustment curves from prior signaled quantization adjustment curves.

In a first aspect, sets of quantization adjustment curves may be specified by prediction within the parameters that specify a set of quantization adjustment curves. In this type of prediction, the parameters may be delta coded with respect to previous parameter. For example, while signaling a q-Step table of N elements, the Kth element of the qStep Table can be coded as delta from (K−1)th element (when available) i.e deltaqStep[k]. During the derivation of the qStep parameters, qStep[K] is derived as qStep[k−1]+deltaqStep[K]. A flag may be signaled to enable or disable such delta coding scheme (based of the previous values).

In a second aspect, sets of quantization adjustment curves may be specified by prediction within across temporal parameters. In this type of prediction, the parameters are copied from already singled parameters, either from the corresponding headers of the temporal pictures (such as picture, tile header, etc.) or of the headers in the same picture (e.g. tile headers), but preceding in coding order. A flag may be signaled to enable or disable such a copying scheme (based of the temporal or already coded preceding values). Specific rules may be defined to specify from where the information can be copied from when multiple tiles are enabled in the sequence. Some example Definitions a. A flag to specify the copy from a global parameter set (e.g. sequence header). When this flag is enabled the parameters are derived by copying from the global parameter set.

b. When the flag is disabled in (a), another flag could be signaled to copy from a particular tile header (e.g. from tile header of temporal picture that has same tileID as the current).

In summary, it can be signaled to specify from where the information may be copied for the current header (e.g. tile).

In a third aspect, sets of quantization adjustment curves may be specified by prediction between color component parameters. In this type of prediction, the parameters are copied from their corresponding components. For example, the parameters are signaled for one of the components (Luma) and the other two component Cb and Cr use the same parameters as Luma. In another example, the parameters are signaled for one of the components (AC coefficients) and the DC component use the same parameters as AC coefficients. A flag may be signaled to enable or disable such copying scheme (based on the corresponding component in the above example). When disabled, separate parameters may be signaled for each of the above components.

Coding Extensions Based on an Improved Quantizer

A flexible quantizer signaling scheme is presented above (e.g. FIGS. 6, 8) where the relationship between quantization indices, q_idx, and the quantization step size, q_step, is explicitly signaled and adapted in an image/video coding specification. This quantizer control may be used, for example, in quantization of the residual signals. In particular, for one set of tiles, images, or sequences, a user may select to signal that a specific range of q_idx values, e.g. q_idx(m) to q_idx(n), corresponds to specific q_step values from q_step0(m) to q_step0(n). However, for a different set of tiles, images, or sequences, a different range of q_step values, i.e. q_step1(m) to q_step1(n), may be selected. Such flexibility can be seen as advantageous in different encoders since it can enable finer and more accurate rate control and rate allocation models to be achieved.

Nevertheless, several normative and non-normative aspects of a coding system, that may support such quantizer flexibility, may be impacted by such a design. In particular, commonly the selection of a quantizer during encoding can impact parameters that control coding mode decisions, such as the lagrangian parameters used for lagrangian based motion estimation, mode decision, as well as other rate distortion based operations, if supported by an encoder, such as rate distortion optimized quantization, sample adaptive offset optimization that is applicable in the context of the HEVC and VVC video coding standards, etc. Such lagrangian optimization is commonly of the form:

$$J = Distortion + lambda * Rate,$$

where Distortion can be any metric of quality that can indicate how much the coded signal differs from the original input, e.g. computed as the Sum of absolute or square differences, while the Rate indicates either the actual or an approximation of the number of bits needed to encode the corresponding information that is currently being optimized. The variable lambda is a control parameter resulting in a preference of the decision process towards either a lower distortion or a lower rate. In such optimization, multiple alternative coding modes or parameters are evaluated using the lagrangian cost J and the one that would result commonly in the minimum such cost is selected as the coding mode. The model can be extended to support additional cost parameters, such as a cost of decoding complexity/power, a cost estimate due to packet losses, quality due to post-processing, etc.

Control of the parameter lambda is commonly achieved by examining the value of the q_idx and by specifying a formulation of lambda given q_idx, but also possibly other parameters such as resolution, slice type, hierarchical level, local complexity/variance, etc. Such relationships have been determined in the past by examining the behavior of the coded sequence under different quantizers and coding conditions and their implications to the lagrangian lambda value, given different models. However, conventional coding specifications employ a fixed q_idx set and thus it is easy to determine the appropriate relationship between q_idx and the lagrangian parameter. It is, nevertheless, a bit more complex to do so in a flexible q_idx to q_step design (such as in FIGS. 6 and 8), given that now the q_idx mapping to q_step is not fixed. Although one could still use the original computation of lambda parameters, this may be suboptimal. For example, a common model that is used in standards like AVC and HEVC is of the form:

$$\text{lambda} = \text{alpha} * 2^{((q\_idx - 12)/3)}.$$

The core form of this computation is based on the unique relationship of q_idx and Qstep in these standards, while alpha is adjusted commonly based on the prediction structures and application targets considered during encoding. For intra coding, for example, a common value used for alpha is equal to 0.68. This computation is sometimes called the "nominal" computation of lambda given a "nominal" q_idx.

Although such a fixed formulation could also be used with the adaptive q_idx to q_step design discussed above, that would be suboptimal and may not result in the best performance for encoding. Instead, one may adjust the lambda computation to be based on the new q_idx to q_step relationship. In particular, one can reformulate the lambda model used in AVC and HEVC to the form:

$$\text{lambda} = \text{alpha} * f(q\_step)$$

In AVC and HEVC q_step is of a form:

$$q\_step(q\_idx) = q\_step(q\_idx \% 6) * 2^{(\text{floor}(q\_idx/6))}$$

where q_step(x), with x in the range of 0 to 5 being equal to 0.625, ~0.702, ~0.787, ~0.884, ~0.992, and ~1.114 respectively. Using that, one can also derive the inverse relationship between q_idx and q_step, for AVC and HEVC. That is, we can approximate the value of q_idx given a q_step as:

$$\text{baseIdx} = \text{floor}(\log 2(q\_step) + 0.68)$$

$$q\_idx(q\_step) = 6 * \text{floor}(\log 2(q\_step) + 0.68) + \text{round}(11 * ((q\_step/(1 < \text{floor}(\log 2(q\_step) + 0.68))) - 0.625))$$

Using that formula, we could then update the nominal lambda formulation above with the q_idx(q_step) function in place of the nominal q_idx, thus:

$$\text{lambda} = \text{alpha} * 2^{((q\_idx(Q\text{step}) - 12)/3)} =>$$

$$\text{lambda} = \text{alpha} * 2^{(6 * \text{floor}(\log 2(q\_step) + 0.68) + \text{round}(11 * ((q\_step/(1 < \text{floor}(\log 2(q\_step) + 0.68))) - 0.625)) - 12)/3)}$$

Assuming that a similar model is applicable across other coding standard encoder implementations we can use the above formula to determine the lambda value for the flexible q_idx mapping method. That is, we first determine the operating q_step for the current partition and then use this q_step in the formulation above to derive the lambda.

For different operations in the encoder the lambda may be computed a bit differently. For example, for motion estimation the lambda is commonly computed as the square root of the lambda for the mode decision process. The extension of the above computations, i.e. remapping the lambda computation from the corresponding nominal computation using q_idx to a formulation using q_step, should be quite straightforward for people experienced in the current art. It should also be quite straightforward to convert other equations used by encoders that specify the derivation of lambda from a nominal q_idx to utilize the q_step value instead.

The derivation of lambda may also depend on which distortion function is used. A similar re-mapping of the lambda from the corresponding nominal computation using q_idx to a formulation using q_step could be extended for the first-order distortions (e.g., sum of absolute differences), second-order distortions (e.g. mean square errors) and higher-order and trained distortions (e.g. SSIM, VMAF etc.). For the higher-order and trained distortions, a Scale-Factor (in addition to alpha) can be computed as a function of metric score for the region (8×8 block, segment etc.) and q_idx(q_step).

Although some encoders may be able to compute the value of lambda for any q_step value, in some instances, e.g. for certain hardware implementations, such computation may be performed using look-up tables of limited size, e.g. of size N. In such a case, one may design the look-up table so as to provide accurate mapping between q_step and lambda for N different, uniformly distributed in the log domain, q_step values, and then use interpolative techniques to derive a more accurate lambda value for the actual selected q_step.

For example, assuming that N is 64 and we wish to cover a Qstep range from 32 to $2^{14}$, we can define the lambda for q_step values at positions 32+256*n, with n going from 0 to N−1. If the q_idx maps to a q_step value different from the defined q_step values, then the lambda can be computed using an interpolation, or if needed extrapolation, process using the closest neighboring defined q_step values. The interpolation could be done using a variety of interpolative methods, e.g. using the bilinear, bicubic, or piecewise cubic hermite polynomial interpolation methods and could be performed preferably in the logarithmic domain, given the characteristics of the quantization step size, or in the linear domain.

This approach could help in reducing the memory requirements of storing the q_step to lambda lookup table while keeping computational complexity also low.

Normative operations, such as loop filtering, motion vector and weighted prediction, etc., that affect both the encoder and the decoder may also be impacted by the consideration of a flexible q_step to q_idx mapping. In particular, loop filtering mechanisms, such as deblocking, adaptive loop filtering (ALF), sample adaptive offset (SAO) filtering, etc., may consider the value of the corresponding q_idx of a block and its neighborhood to adjust the strength of the filtering mechanism performed on the samples within that block. For example, in AVC and HEVC tables are defined that specify q_idx dependent thresholds that impact how and when pixels should be filtered. These tables could also be defined as formulas between thresholds T and q_idx, i.e. T=g(q_idx). Such thresholds are defined based on the expected distortion that a q_idx may result in, given also its association with a specific q_step value. However, for the flexible q_idx designs described herein, it may be more appropriate to redefine such tables or formulas based on a the actual q_step values, i.e. T=h(q_step), instead of the index q_idx. Conversion of such formulations, i.e. from q_idx to q_step, can be done very similar to how the conversion of the lagrangian parameter derivation formulations was performed above.

If it is desirable to compute such thresholding mechanisms using table lookups, as in HEVC, then either a fixed table can be used that only accounts for "quantized" q_step values as indicated by the entries in the fixed table, or through the use of the interpolative techniques that were also utilized for the lagrangian parameter derivation.

In an aspect for in-loop deblock filtering, a deblocking filter strength may be related to the degree of quantization. A higher degree of quantization in pixel block (or other portion of an image) may lead to an increased visual blocking artifact, and hence use of a stronger deblocking filter may improve compression quality. An in-loop deblocking filter may used in both an encoder and decoder, and the deblocking filter strength may be inferred from other coding parameters instead of being explicitly signaled in a compressed bitstream between encoder and decoder. In AVC and HEVC, the deblocking filter strength is inferred (at least in part) based on the quantizer index (q_idx) used for a pixel block. In the more flexible quantizer designs described herein, the q_idx may not be a reliable predictor for degree of quantization used, the severity of a blockiness artifact, or the best in-loop filter strength. With these more flexible quantizer designs, a deblocking filter strength may be better predicted from either a q_step or qp (quantization parameter) value.

Other processes in both the encoder and decoder may also utilize quantization information to perform or adapt coding steps. For example, motion vector prediction considers spatially and temporally neighboring partitions to the current block to determine possible motion vector candidates for predicting and coding the current motion vector. Such derivation may also utilize quantization, since that has a direct relationship to the quality of the candidate and, consequently, its motion vector. If a neighbor is of higher quality than another neighbor, then it is likely that the motion vectors of the higher quality neighbor might be more highly correlated than those of the lower quality one. Consideration of the actual q_step used for a neighbor instead of the q_idx could allow for better consideration of the relative quality between the different neighbor partitions and thus potentially a more accurate determination of the final motion vector predictor. In particular, we could place a higher quality motion vector candidate at a lower index position compared to other lower quality motion vector candidates in the motion vector prediction list. Since some motion vector candidates may be the same or similar, having more precise method of placing these candidates in the motion vector list could prove beneficial. A similar approach could be used for the prediction of other information such as weighted prediction parameters.

In an aspect, prediction search may be based on the degree of quantization of candidate prediction references. For various types of prediction from multiple possible prediction references, the accuracy of the prediction accuracy may be related to the degree of quantization. A prediction reference that was highly quantized may provide a poor prediction as compared to a prediction reference that was not as highly quantized. Hence, when choosing a single motion prediction reference at an encoder (for example, for inter- or intra-prediction of pixel data), the encoder may include a bias toward choosing the a prediction reference that was previously quantized to a lesser degree, and the degree of quantization may be more accuracy determined based on q_step or qp rather than q_idx. In the case of a weighted combination of multiple prediction references at an encoder or decoder, the weighting may be based on q_step or qp (instead of q_idx). For example, a linear weighted prediction may be:

$$\text{Final\_predictor} = f(q(c1)) * \text{prediction\_info}(c1) + f(q(c2)) * \text{prediction\_info}(c2),$$

where c1/c2 are the candidates q(x) is the quantizer strength of candidate x (as measured by q_step or qp), and f corresponds to some weighting, while prediction_info is whatever information is being predicted (could be motion vectors, weights, or even samples, e.g. for intra or inter prediction). Relative weighting may also be used to ensure that the weights sum to 1, for example:

$$\text{Final\_predictor} = (f(q(c1))) * \text{prediction\_info}(c1) + f(q(c2)) * \text{prediction\_info}(c2))/(f(q(c1)) + f(q(c2))).$$

In another aspect, the quantization step size adjustment curve for a particular pixel region can be constructed based on pixel intensity distribution of its background region with respect to the foreground region. The region here could be a block, a tile, a segment or entire frame. For example, a quantization step size value can be derived for a block of N×N pixels in following steps. In the first step, for each N×N block, a background region is estimated, and its average pixel intensities are computed. The methods to estimate the background region could be straightforward such as the surrounding M row/column of pixels around the block of N×N pixels may constitute the background. Alternatively, the background region derivation could involve more sophisticated methods such as tracking, human pose estimations, background mixture models, fuzzy and deep learning-based methods, etc. In the second step, a contrast factor is computed based on absolute difference of pixel intensities between the background pixels and the non-background pixels within the current region (e.g., block of N×N pixels). The factor could also be computed, for example, as the weighted absolute difference based on the pixel distance of the background pixel with respect to the nearest foreground pixel. In the third step, a quantization step size scaling factor is computed as a function of average pixel intensities of the background derived as in step 1 and as a function of contrast factor in derived in step 2. This scaling factor can be normalized and clipped to a fall within the bounds of adjacent step-sizes. This scaling factor can be interpreted as a perceptual mask of the block with respect to the neighboring blocks and this factor can be applied as a ratio to any of the quantization curves discussed in this disclosure. Alternatively, the quantizer steps that results after applying these scaling factor can form a new quantizer curve after normalization and can be signaled at sequence, frame, tile or segment headers.

The foregoing discussion has described operation of the aspects of the present disclosure in the context of video coders and decoders, such as those depicted in FIGS. 2-3. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic, magnetic, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

We claim:

1. A quantization method, comprising:
   deriving, from transition point data signaled in a data stream representing coded video data, a new quantization adjustment curve, the transition point data containing identifiers of indices into tables identifying portions of a plurality of default adjustment curves stored in the tables to be used for derivation of the new quantization adjustment curve;
   for an element of video to be processed, deriving a quantization adjustment value from the new quantization adjustment curve according to an index value associated with the element of video to be processed;
   deriving a quantization parameter from the quantization adjustment value; and
   applying the quantization parameter on the element of video in a quantization operation.

2. The method of claim 1, wherein the transition point data includes a table index identifying a default adjustment curve, and the indices into tables indicate a range of indices into the table to be used for derivation of the new quantization adjustment curve.

3. The method of claim 1, wherein the transition point data includes a scaling value identifying a scaling to be applied to the portions of the plurality of default adjustment curves for derivation of the new quantization adjustment curve.

4. The method of claim 1, wherein the quantitation operation is a quantization of transform coefficients performed by a video coder.

5. The method of claim 1, wherein the quantitation operation is a dequantization of transform coefficients performed by a video decoder.

6. The method of claim 1, wherein the new quantization adjustment curve at each index location along the curve represents a quantization matrix of quantization adjustments to be applied to a respective matrix of transform coefficients.

7. The method of claim 1, wherein:
   the plurality of default adjustment curves are represented by a corresponding plurality of tables of quantization step sizes,
   the transition point data defines transitions between tables of the plurality of tables indicating which of the tables contribute to the new quantization adjustment curve over which ranges of indices into the tables, and
   the quantization adjustment value is derived from the quantization step size entry of the table selected by the transition point data for the index value.

8. The method of claim 1, wherein: there are different sets of transition point data for different portions of the data stream, and a new quantization adjustment curve is derived for each of the different portions of the data stream.

9. The method of claim 8, wherein the different portions are AC and DC coefficients.

10. The method of claim 8, wherein the different portions are luma and chroma coefficients.

11. The method of claim 8, wherein the different portions are I-frames, P-frames, and B-frames.

12. The method of claim 8, wherein a later set of transition point data is predicted from a prior set of transition point data.

13. The method of claim 1, wherein the transition point data includes a selected quantization step mode and selected parameters of the selected quantization step mode.

14. The method of claim 1, further comprising:
    deriving a filter strength based on the quantization adjustment value;
    applying an in-loop filter at the derived filter strength to the element of video.

15. A quantization method, comprising:
    deriving a new quantization adjustment curve from a quantization step mode and associated transition point data indicating identifiers of indices into tables identifying a plurality of quantization adjustment curves stored in the tables for the selected quantization step mode signaled in a data stream representing coded video data;
    for an element of video to be processed, deriving a quantization adjustment value from the new quantization adjustment curve according to an index value associated with the element of video to be processed;
    deriving a quantization parameter from the quantization adjustment value; and
    applying the quantization parameter on the element of video in a quantization operation.

16. The method of claim 15, wherein the selected quantization step mode is pre-defined mode.

17. The method of claim 15, wherein the selected quantization step mode includes linear quantization adjustment curves with slopes that double from the immediately prior quantization adjustment curve.

18. The method of claim 15, wherein the selected quantization step mode includes associated parameters specifying one quantization adjustment curve, and subsequence quantization adjustment curves of the plurality of quantization adjustment curves are determined by replicating the one quantization adjustment curve.

19. The method of claim 15, wherein the selected quantization step mode includes associated parameters defining a table of quantization step sizes for each of the plurality of quantization adjustment curves.

20. The method of claim 15, furthers comprising:
    deriving a filter strength based on the quantization adjustment value; and
    applying an in-loop filter at the derived filter strength to the element of video.

21. A coding system, comprising:
    a quantizer for applying a quantization parameter to an element of video,
    a controller for controlling the quantizer, and
    a memory storing instructions that when executed by the controller cause:
    deriving, from transition point data signaled in a data stream representing coded video data, a new quantization adjustment curve, the transition point data containing identifiers of indices into tables identifying portions of a plurality of default adjustment curves stored in the tables to be used for derivation of the new quantization adjustment curve;

for the element of video to be processed, deriving a quantization adjustment value from the new quantization adjustment curve according to an index value associated with the element of video to be processed; and deriving the quantization parameter from the quantization adjustment value.

22. A non-transitory storage medium storing instructions that, when executed on a processor, cause:

deriving a new quantization adjustment curve from a quantization step mode and associated transition point data indicating identifiers of indices into tables identifying a plurality of quantization adjustment curves stored in the tables for the selected quantization step mode signaled in a data stream representing coded video data;

for an element of video to be processed, deriving a quantization adjustment value from the new quantization adjustment curve according to an index value associated with the element of video to be processed;

deriving a quantization parameter from the quantization adjustment value; and applying the quantization parameter on the element of video in a quantization operation.

* * * * *